(12) United States Patent
Yoshida

(10) Patent No.: US 7,974,350 B2
(45) Date of Patent: Jul. 5, 2011

(54) PROPAGATION PATH ESTIMATION METHOD AND APPARATUS

(75) Inventor: Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 709 days.

(21) Appl. No.: 11/153,191

(22) Filed: Jun. 15, 2005

(65) Prior Publication Data

US 2006/0013326 A1 Jan. 19, 2006

(30) Foreign Application Priority Data

Jul. 13, 2004 (JP) ................................. 2004-205454
Sep. 22, 2004 (JP) ................................. 2004-274455

(51) Int. Cl.
*H04K 1/10* (2006.01)
*H04L 27/28* (2006.01)
(52) U.S. Cl. ......... 375/260; 375/285; 375/254; 375/268
(58) Field of Classification Search .................. 375/260, 375/259, 263, 290, 141, 148, 347, 349
See application file for complete search history.

(56) References Cited

U.S. PATENT DOCUMENTS

| 4,055,727 | A | * | 10/1977 | Katoh | 375/263 |
|---|---|---|---|---|---|
| 4,439,863 | A | * | 3/1984 | Bellamy | 375/290 |
| 5,159,610 | A | * | 10/1992 | Eyuboglu et al. | 375/290 |
| 5,307,376 | A | | 4/1994 | Castelain et al. | |
| 5,809,080 | A | * | 9/1998 | Karabed et al. | 375/263 |
| 6,717,990 | B1 | * | 4/2004 | Abousleman | 375/265 |
| 7,167,518 | B2 | * | 1/2007 | Wei | 375/240 |
| 2003/0108117 | A1 | * | 6/2003 | Ketchum et al. | 375/295 |
| 2006/0203932 | A1 | * | 9/2006 | Palanki et al. | 375/295 |
| 2008/0152033 | A1 | * | 6/2008 | Gore et al. | 375/260 |

FOREIGN PATENT DOCUMENTS

| JP | 5-75568 | 3/1993 |
|---|---|---|
| JP | 2000-341242 | 12/2000 |
| JP | 2004-23405 | 1/2004 |

OTHER PUBLICATIONS

English translation of JP5075568; Kasutere et al; "Apparatus for Evaluating Frequency Response of Communication Channel and Performing Coherent Demodulation of Digital data Multiplexed in Time-Frequency Region Having Limit Judging Function", Mar. 26, 1993.*
Performance of Forward Link Broadband Packet TD-OFCDM with Interactive Channel Estimation. Technical Report of IEICE. Jan. 2001.
Notification of Reasons for Refusal mailed Aug. 25, 2009, from the corresponding Japanese Application.

* cited by examiner

*Primary Examiner* — Chieh M Fan
*Assistant Examiner* — Qutbuddin Ghulamali
(74) *Attorney, Agent, or Firm* — Katten Muchin Rosenman LLP

(57) ABSTRACT

In estimating propagation path in an OFDM receiver in an OFDM communication system, a CIR estimation unit estimates a group of impulse responses of a propagation path, a valid-impulse discriminator selects impulse responses (CIR), which are greater than a predetermined threshold value, from the impulse-response group, and a propagation path estimation unit generates a matrix expression using a CIR estimation vector that includes the selected CIRs as elements, a matrix S, which is decided based upon number N of points of an IFFT used in OFDM modulation and number Nc of subcarriers used in actual transmission, and a propagation-path response vector, obtains the propagation-path response vector by solving this matrix expression and estimating the propagation path.

7 Claims, 25 Drawing Sheets

FIG. 5
(A)
MULTIPLE PATHS $PT_0 \sim PT_7$
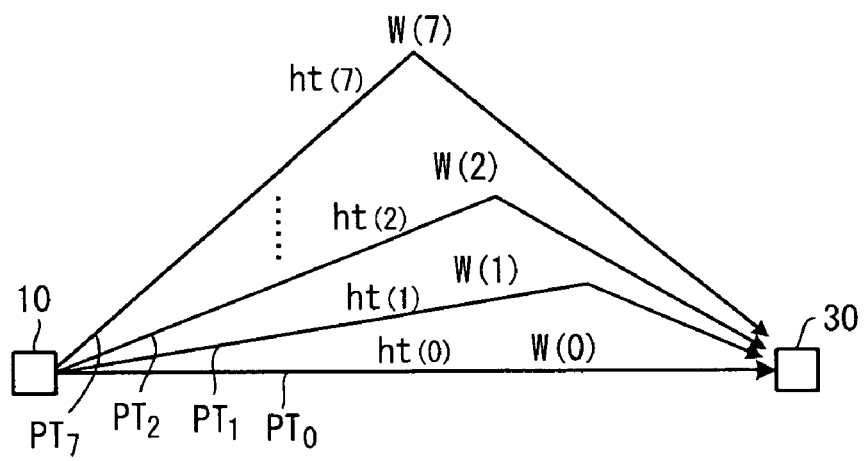
(B)
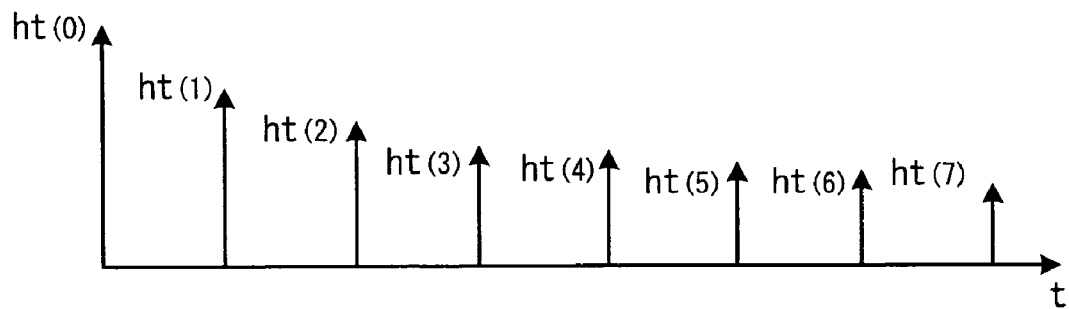

FIG. 16

SIMULATION PARAMETERS

| CARRIER FREQUENCY | 5GHz |
|---|---|
| SAMPLING FREQUENCY | 78.34MHz |
| SUBCARRIER FREQUENCY | 896 |
| IFFT/IFFT POINT COUNT | 1024 |
| SUBCARRIER SPACING | 76.5KHz |
| SYMBOL SPACING | 15.63us |
| GI LENGTH | 2.55us (200samples) |
| FRAME LENGTH | 0.5ms |
| MODULATION SCHEME | 16QAM |
| ERROR-CORRECTING ENCODING | TURBO ENCODING(R=1/2, K=4)<br>Max·Log·MAP(Iteration=8)DECODING |
| RECEIVE DIVERSITY | NO |
| TRANSMISSION-PATH MODEL | THE NUMBER OF PATHS IS TWO.<br>THE RECEPTION LEVELS OF TWO PATHS ARE IDENTICAL. |

FIG. 17

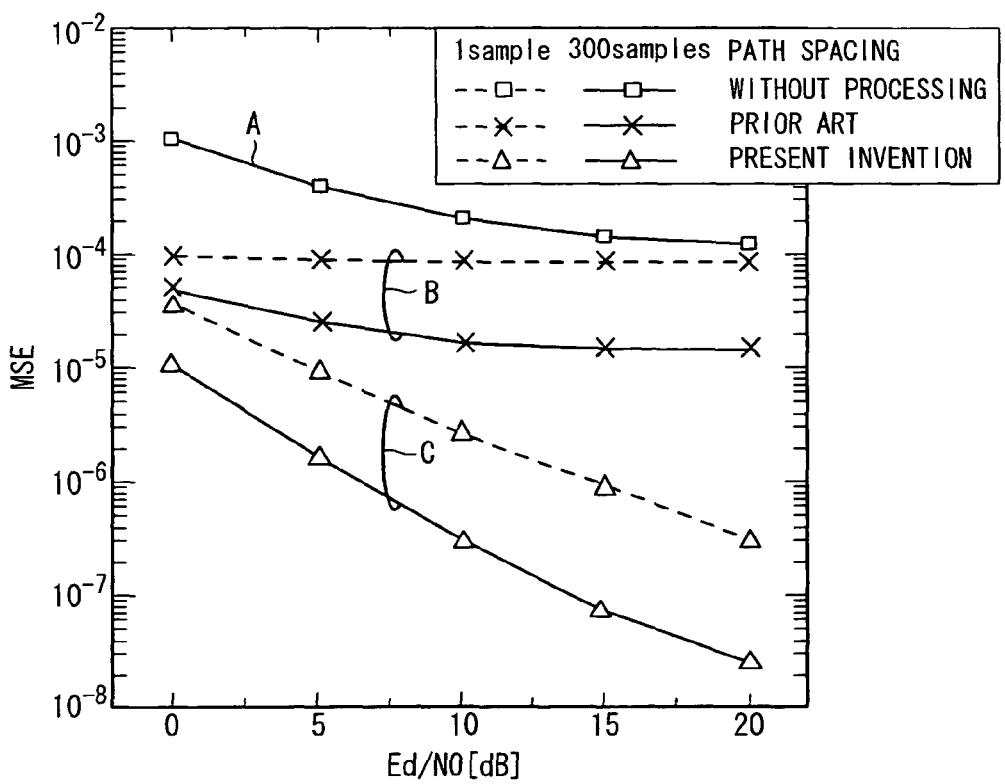

FIG. 18

SIMULATION PARAMETERS

| CARRIER FREQUENCY | 5GHz |
|---|---|
| SAMPLING FREQUENCY | 78.34MHz |
| SUBCARRIER FREQUENCY | 896 |
| IFFT/IFFT POINT COUNT | 1024 |
| SUBCARRIER SPACING | 76.5KHz |
| SYMBOL SPACING | 15.63us |
| GI LENGTH | 2.55us (200samples) |
| FRAME LENGTH | 0.5ms |
| MODULATION SCHEME | 16QAM |
| ERROR-CORRECTING ENCODING | TURBO ENCODING (R=1/2, K=4) Max·Log·MAP (Iteration=8) DECODING |
| RECEIVE DIVERSITY | YES |
| TRANSMISSION-PATH MODEL | THE NUMBER OF PATHS IS TWELVE. THE RECEPTION LEVELS OF THE PATHS DIMINISH EXPONETIALLY. |

FIG. 19

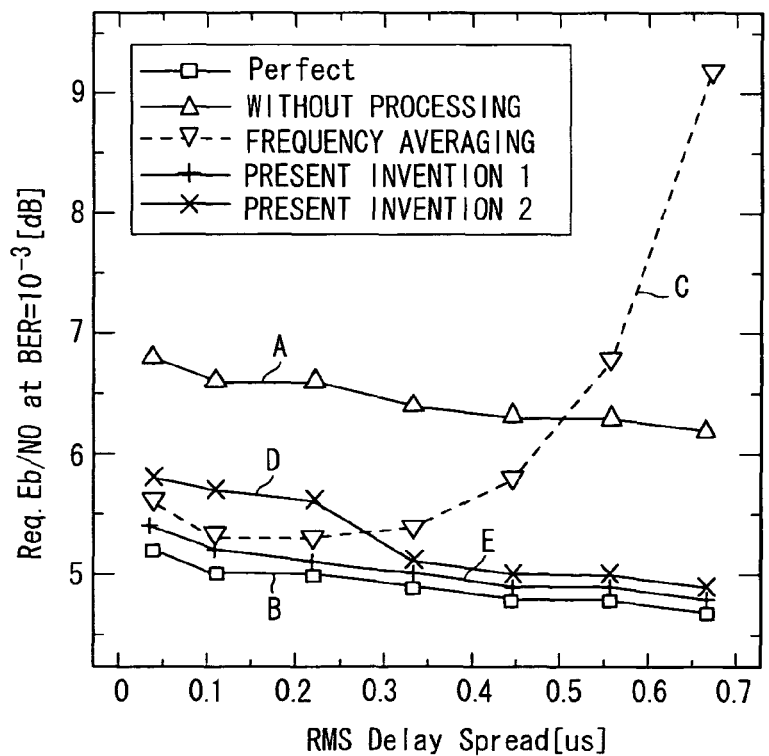

Eb/No VS. BER CHARACTERISTIC (16QAM, CHANNEL A)

Eb/No VS. BER CHARACTERISTIC (16QAM, CHANNEL B)

Eb/No VS. BER CHARACTERISTIC (64QAM, CHANNEL A)

Eb/No VS. BER CHARACTERISTIC (64QAM, CHANNEL B)

SUBCARRIER NO.

FIG. 34  PRIOR ART
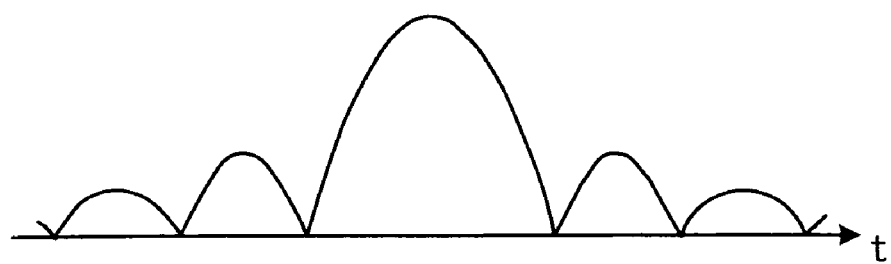
FIG. 35  PRIOR ART
(A)
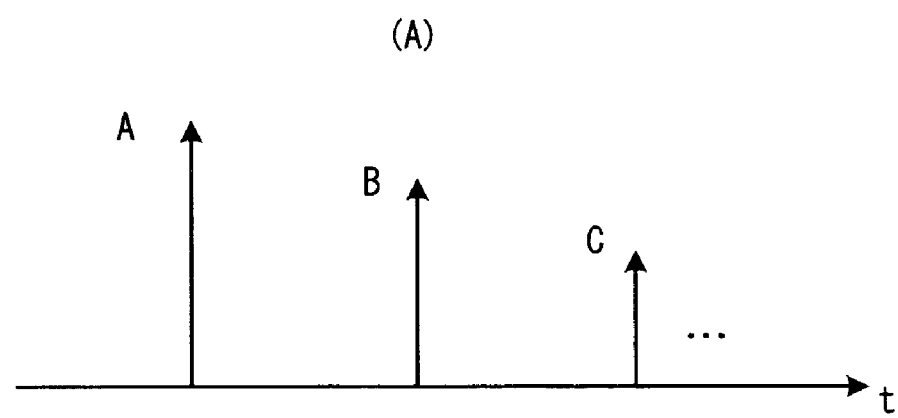
(B)
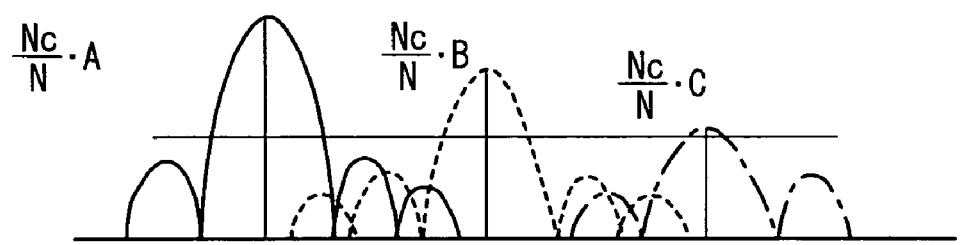

PROPAGATION PATH ESTIMATION METHOD AND APPARATUS

BACKGROUND OF THE INVENTION

This invention relates to a method and apparatus for estimating a propagation path. More particularly, the invention relates to a propagation path estimation method and apparatus for estimating a propagation path traversed by a transmit signal in a receiver when communication utilizing OFDM (Orthogonal Frequency Division Multiplexing) is performed.

Frequency-selective fading ascribable to a multipath environment occurs in wideband wireless communications. An effective method of dealing with this is multicarrier modulation, which divides the transmission bandwidth into narrow bands (subcarriers) that do not undergo frequency-selective fading, and transmits the subcarriers in parallel.

At present, specifications regarding digital TV and audio broadcasts (in Japan and Europe) and wireless LAN (IEEE 802.11a) are being standardized based upon OFDM transmission, which is one type of multicarrier modulation. An OFDM-based modulation scheme has been proposed for next-generation mobile communication systems as well.

With a wireless communications system that employs OFDM-based modulation, it is necessary to estimate the propagation path characteristics (propagation path information) of all subcarriers. The precision of the estimation has a major effect upon transmission error rate in a manner similar to that of other wireless communications systems that use coherent detection. For this reason, a wireless communications system using OFDM-based modulation transmits a known symbol on a subcarrier used in transmission and estimates propagation path information subcarrier by subcarrier. As mentioned above, the precision of propagation path estimation has a major effect upon the transmission error rate and hence there are many cases where use is made of a technique that suppresses background noise contained in a propagation path estimation value estimated using a known symbol, or a so called pilot symbol. For example, a first prior-art technique is to average frequency between adjacent subcarriers [see Hiroyuki Atarashi, Sadayuki Abeta and Mamoru Sawahashi, "Performance of Forward Link Broadband Packet TD-OFCDM with Iterative Channel Estimation", Technical Report of IEICE., DSP2000-154, SAT2000-110, RSC2000-186 (2001-01)], and a second prior-art technique is forced zero substitution of an impulse-response group on an estimated propagation path (see JP2000-341242).

The first prior-art technique performs averaging between adjacent subcarriers utilizing coherence (uniformity) in the frequency direction, thereby suppressing background noise. For example, if we let $h_1$ to $h_{512}$ represent the propagation path characteristics of 512 subcarriers, as shown in FIG. 32, the propagation path characteristics of three adjacent subcarriers are averaged and the average is adopted as the propagation path characteristic of the middle subcarrier. The first prior-art technique utilizes a certain property, namely that if the propagation path characteristics in a coherent bandwidth that is proportional to the reciprocal of delay spread are coherent and M-number of subcarriers exist in this coherent bandwidth, then the propagation path characteristics of these M-number of subcarriers will be the same. The first prior-art technique is such that if the delay spread is small, the amount of fluctuation in the propagation path characteristics along the frequency direction is slight (correlation is large) and therefore background noise can be suppressed effectively by increasing the number of averaging operations in the frequency direction. With regard to the definition of delay spread, a difference develops between the arrival times of received waves in a multipath environment. The spread between these delay times is referred to as delay spread.

In the first prior-art technique, however, correlation between amounts of channel fluctuation between adjacent subcarriers diminishes as delay spread increases. Consequently, a problem which arises is that estimation precision declines if the number of averaging operations along the frequency direction is made greater than necessary. Actual delay spread involves a great deal of fluctuation and, in an outdoor environment, can be 0.2 to 2.0 μs in urban areas and 10 to 20 μs in mountainous areas. This means that with the first prior-art technique, it is necessary to select the optimum number of averaging operations while measuring delay spread. Further, even if the optimum number of averaging operations has been selected, a problem which arises is that averaging cannot be performed in an environment where the delay spread is large, as in mountainous areas, and background noise will not be suppressed and receiver performance will be degraded compared to the without-averaging technique.

The second prior-art technique compares the power of an impulse-response group on an estimated propagation path with a predetermined threshold value and forcibly substitutes zero for impulses that are below the threshold value, thereby suppressing background noise. An OFDM signal is such that a signal that has been mapped to a subcarrier is transmitted upon being converted to the time domain by IFFT processing. However, if the IFFT size (N-point IFFT) and number (Nc) of subcarriers used in signal transmission differ, this is equivalent to performing multiplication by a rectangular window on the frequency axis. As a result, a time signal in OFDM is a signal of a convoluted time response function decided by the number (Nc) of subcarriers used. If the subcarriers at the edges of the spectrum is not used for transmission, time response is followed by a sinc function. Under the condition that time response is the sinc function, the second prior-art technique utilizes this feature to set the threshold value to a value that is approximately 13 dB below the main lobe, thereby arranging it so that a side lobe of the sinc function will not be discriminated as a valid path (impulse).

If N-point IFFT processing is executed with N items of data serving as the components of N-number of subcarrier components $f_1$ to $f_N$, the frequency spectrum is as indicated at (A) in FIG. 33. In OFDM, a signal that has undergone IFFT processing is converted to an analog signal, baseband signal components of $f_1$ to $f_N$ are extracted from the analog signal by a low-pass filter, and these are up-converted to radio frequency and transmitted. In order to select baseband signal components of $f_1$ to $f_N$, a low-pass filter having a sharp cut-off characteristic is necessary. Fabricating such a filter, however, is difficult. Accordingly, carriers on both sides of the N-number of subcarriers $f_1$ to $f_N$ are not used in data transmission, i.e., Nc-number (Nc<N) of subcarriers are used in data transmission, as illustrated at (B) in FIG. 33. When the number Nc of subcarriers used in data transmission and the IFFT size (=N) thus differ, the propagation-path response becomes a sinc function and not an impulse and the peak value of the main lobe diminishes to Nc/N, as illustrated in FIG. 34. Consequently, in a case where Nc=N holds, the propagation-path response becomes an impulse, as illustrated at (A) in FIG. 35, but if Nc<N Holds, it becomes a waveform on which the sinc function has been superimposed, as indicated at (B) in FIG. 35. The second prior-art technique sets the threshold value to a value that is approximately 13 dB below the main lobe, thereby suppressing background noise in such a manner that a side lobe of the sinc function will not be discriminated as a valid path (impulse).

In the second prior-art technique, the side lobes of the sinc function are eliminated and only the main lobe is discriminated as a valid path. However, since the amplitude of the main lobe diminishes to Nc/N owing to the nature of the sinc function, a problem with the second prior-art technique is a residual estimation error. Further, in propagation environment in which path spacing is small, interference develops between the side lobes of the sinc function, the combined value in the overlapped sample exceeds the threshold value and a path is erroneously judged to be present where no path exists.

SUMMARY OF THE INVENTION

Accordingly, an object of the present invention is to provide a propagation path estimation method and apparatus in which it is possible to suppress background noise irrespective of the propagation environment, such as delay spread and path spacing.

A further object of the present invention is to provide a propagation path estimation method and propagation path estimation apparatus capable of correctly estimating propagation paths and improving BER characteristics, even when path positions in a real multipath environment deviate from measured sample positions.

The present invention provides a propagation path estimation method and apparatus of a receiver in an OFDM (Orthogonal Frequency Division Multiplexing) communication system for performing communication by OFDM.

A first propagation path estimation method according to the present invention comprises the steps of: estimating an impulse-response group of a propagation path; selecting impulse responses, which are greater than a predetermined threshold value, from the impulse-response group; substituting zero for samples other than a prescribed number of samples bracketing a maximum peak in the impulse responses selected; and estimating the propagation path using the impulse responses obtained by substitution.

A second propagation path estimation method according to the present invention comprises the steps of: estimating an impulse-response group of a propagation path; selecting propagation-path impulse responses (CIRs), which are greater than a predetermined threshold value, from the propagation-path impulse-response group; and generating a matrix expression using a CIR estimation vector ($\hat{h}_{CIR}$)

that includes the selected CIRs as elements, a matrix S, which is decided by number N of points of IFFT used in OFDM modulation and number Nc of subcarriers used in actual transmission, and a propagation-path response vector ($\hat{h}_t$)

and obtaining the propagation-path response vector by solving this matrix expression. The matrix expression is $$\hat{h}_{CIR} = S \cdot \hat{h}_t + P_t^* \cdot \vec{w}$$

(where $P_t^*$ is a conjugate transposed matrix of known pilot symbols) taking a noise power vector $\vec{w}$ into account. The propagation-path response vector is found from this matrix expression.

Further, the matrix S is a sinc function matrix decided by the number N of points of the IFFT and number Nc of subcarriers, an inverse matrix of the S matrix is found, the inverse matrix is used to multiply the CIR estimation vector to thereby calculate the propagation-path response vector, and those elements of the propagation-path response vector obtained by calculation that are less than a threshold value are made zero to estimate the propagation path. Alternatively, the matrix S is a sinc function matrix decided by the number N of points of the IFFT and number Nc of subcarriers, a weight matrix that is in accordance with the minimum mean square error (MMSE) is obtained using the matrix S and noise variance, this matrix is used to multiply the CIR estimation vector to thereby calculate the propagation-path response vector, and the propagation path is estimated from the propagation path vector.

A third propagation path estimation method of this invention has the steps of estimating impulse responses in the frequency domain of a propagation path; M-fold oversampling (where M is an integer greater than or equal to 1) of estimated impulse responses; converting M-fold oversampled impulse responses into the time domain; selecting an impulse response equal to or greater than a predetermined threshold value, from among the time-domain impulse responses; replacing everything other than a prescribed number of samples before and after the maximum peak in the selected impulse response with a prescribed value; estimating the time response of the propagation path, using the impulse response obtained by the above replacement; and converting the estimated time response into the frequency domain, performing M-fold down sampling, and then estimating the M-fold downsampled propagation path.

A fourth propagation path estimation method of this invention has the steps of estimating impulse responses in the frequency domain of a propagation path; M-fold oversampling (where M is an integer greater than or equal to 1) of estimated impulse responses; converting M-fold oversampled impulse responses into the time domain; selecting an impulse response equal to or greater than a predetermined threshold value, from among the time-domain impulse responses, and of generating an impulse response vector; creating a time response function matrix according to time response functions, based on the number N of IFFT points used in OFDM modulation and on the number $N_C$ of subcarriers used in actual propagation, and of multiplying the inverse matrix of the above matrix by the above impulse response vector to estimate the propagation path time response; and converting the estimated time response into the frequency domain, and then of performing M-fold downsampling and estimating the propagation path.

A first propagation path estimation apparatus according to the present invention comprises: a CIR estimation unit for estimating a group of impulse responses of a propagation path; a valid-impulse discriminator for selecting impulse responses, which are greater than a predetermined threshold value, from the impulse-response group and substituting zero for samples other than a prescribed number of samples bracketing a maximum peak in the impulse responses selected; and a propagation path estimation unit for estimating the propagation path using the valid impulse responses.

A second propagation path estimation apparatus according to the present invention comprises: a CIR estimation unit for estimating an impulse response (CIR) group of a propagation path; a valid-impulse discriminator for selecting propagation-path impulse responses (CIR), which are greater than a predetermined threshold value, from the propagation-path impulse-response group; and a propagation path estimation unit for generating a matrix expression using a CIR estimation vector $$(\hat{h}_{CIR})$$

that includes the selected CIRs as elements, a matrix S, which is decided by a number N of points of an IFFT used in OFDM modulation and number Nc of subcarriers used in actual transmission, and a propagation-path response vector $$(\bar{h}_t)$$

and obtaining the propagation-path response vector and estimating the propagation path by solving this matrix expression.

A third propagation path estimation apparatus of the present invention comprises an impulse response estimation unit, which estimates the impulse response in the frequency domain of propagation paths; an oversampling unit, which performs M-fold (where M is an integer greater than or equal to 1) oversampling of estimated impulse responses; an inverse Fourier transform unit, which converts M-fold oversampled impulse responses into the time domain; a valid impulse judgment unit, which selects an impulse response equal to or greater than a predetermined threshold value, from among the time-domain impulse responses; an estimation unit, which replaces everything other than a prescribed number of samples before and after the maximum peak in the selected impulse response with a prescribed value and estimates the time response of the propagation path; a Fourier transform unit, which converts the estimated propagation path time response into the frequency domain; and, a propagation path estimation unit, which performs M-fold downsampling of the time response in the frequency domain and estimates the propagation path.

A fourth propagation path estimation apparatus of the present invention comprises an impulse response estimation unit, which estimates the impulse response in the frequency domain of propagation paths; an oversampling unit, which performs M-fold (where M is an integer greater than or equal to 1) oversampling of estimated impulse responses; an inverse Fourier transform unit, which converts M-fold oversampled impulse responses into the time domain; a valid impulse judgment unit, which selects an impulse response equal to or greater than a predetermined threshold value, from among the time-domain impulse responses, and generates an impulse response vector; a propagation path time response estimation unit, which creates a time response function matrix using time response functions, based on an integral multiple M×N of the number N of IFFT points used in OFDM modulation and on the number $N_C$ of sub-carriers used in actual propagation, and which estimates the propagation path time response by multiplying the inverse matrix of the above matrix by the above impulse response vector; a Fourier transform unit, which converts the estimated propagation path time response into the frequency domain; and means of performing M-fold downsampling of the frequency domain propagation path time response and for estimating the propagation path.

In accordance with the present invention applied to communication using OFDM-based modulation in which subcarriers not used in data transmission exist, even if a delayed wave that exceeds a GI (Guard Interval) is generated, it is possible to obtain a propagation path estimation value in which background noise is suppressed to a level equivalent to that in a case where the propagation path is known.

Further, in accordance with the present invention, it is possible to suppress background noise irrespective of the propagation environment such as delay spread and path spacing.

According to this invention, even when path positions in an actual multipath environment deviate from sampled positions measured by the system, error due to deviation from the sampled positions can be suppressed through oversampling. As a result, background noise can also be suppressed, and by downsampling after noise suppression the propagation path time response characteristics for paths can be correctly estimated, and BER characteristics can be improved.

Other features and advantages of the present invention will be apparent from the following description taken in conjunction with the accompanying drawings.

BRIEF DESCRIPTION OF THE DRAWINGS

FIG. 5 is a diagram useful in describing a propagation-path response vector;

FIG. 16 is a diagram useful in describing first simulation parameters;

FIG. 17 illustrates an Eb/N0 vs. MSE characteristic, which is the result of a first simulation;

FIG. 18 is a diagram useful in describing second simulation parameters;

FIG. 19 illustrates a delay spread vs. required Eb/N0 characteristic, which is the result of a first simulation;

FIG. 34 is a diagram useful in describing propagation-path response (a sinc function) in a case where subcarriers on both sides of N-number of subcarriers $f_1$ to $f_N$ are not used in data transmission in the prior art; and FIG. 35 is a diagram useful in describing problems encountered with a second prior-art technique.

DESCRIPTION OF THE PREFERRED EMBODIMENTS

(A) First Embodiment

In execution of propagation path estimation of an OFDM receiver in an OFDM communication system, a CIR (Channel Impulse Response) estimation unit estimates an impulse-response group of a propagation path, a valid-impulse discriminator selects impulse responses (CIR), which are greater than a predetermined threshold value, from the impulse-response group, and a propagation path estimation unit generates a matrix expression using a CIR estimation vector that includes the selected CIRs as elements, a matrix S, which is decided by a number N of points of an IFFT used in OFDM modulation and number Nc of subcarriers used in actual transmission, and a propagation-path response vector, and obtains the propagation-path response vector and estimates the propagation path by solving this matrix expression.

Figure 1:
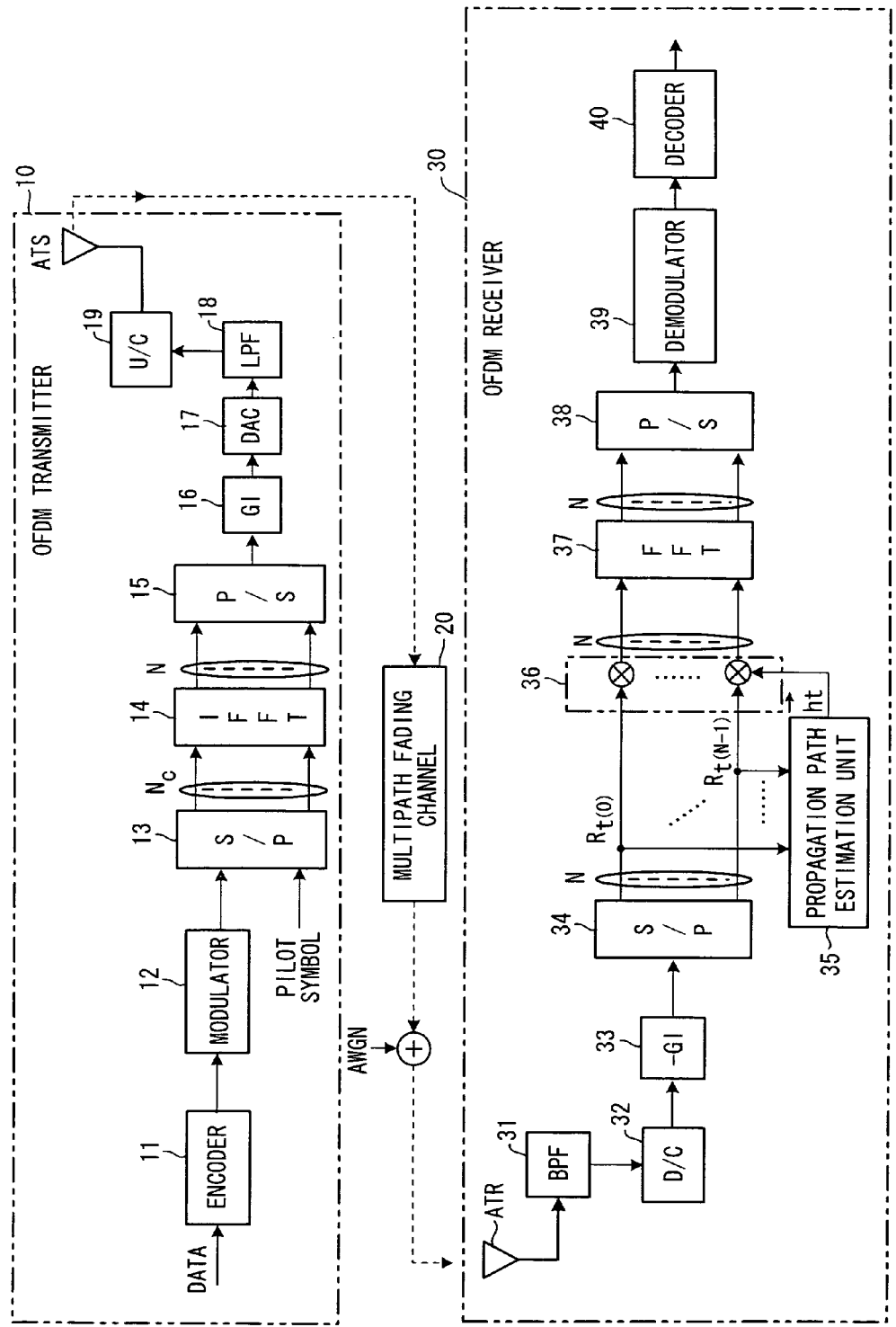
FIG. 1 is a block diagram illustrating the configuration of an OFDM communication system having a propagation path estimation unit according to the present invention.

FIG. 1 is a block diagram illustrating the configuration of an OFDM communication system having a channel estimation unit according to the present invention. An OFDM transmitter 10 includes an encoder 11 for encoding binary data by, e.g., convolutional encoding or turbo encoding, and a modulator 12 for modulating the encoded data by, e.g., QPSK, after interleaving is performed. A serial/parallel (S/P) converter 13 converts a modulated data symbol or pilot symbol to a parallel data sequence of Nc symbols and generates Nc-number of subcarrier components.

The OFDM transmitter 10 further includes an N-point inverse fast-Fourier transform (IFFT) unit 14 that applies inverse fast-Fourier transform (IFFT) processing to the Nc-number of subcarrier components (modulated data), which enters from the S/P converter 13, substituting zero for (N-Nc)-number of subcarriers of the N-number of subcarriers. A parallel/serial (P/S) converter 15 converts, to serial data, N-number of items of time-series data obtained by the IFFT processing and outputs the serial data as an OFDM symbol. The transmitter further includes a guard-interval insertion unit 16 that inserts a guard interval GI into the OFDM symbol comprising the N-number of items of time-series data; a digital/analog (D/A) converter 17 that converts the signal, which is output from the guard-interval insertion unit 16, to an analog signal; a low-pass filter 18 for selecting and outputting a baseband signal component; and a radio unit 19 for up-converting the baseband signal to a radio frequency, subsequently amplifying the signal and transmitting it from an antenna ATS. The signal that has been transmitted from the antenna ATS is transmitted over a multipath propagation path (multipath fading channel) 20 and is received by an OFDM receiver 30. AWGN (Additive White Gaussian Noise) is impressed upon the transmit signal during propagation.

Figure 2:
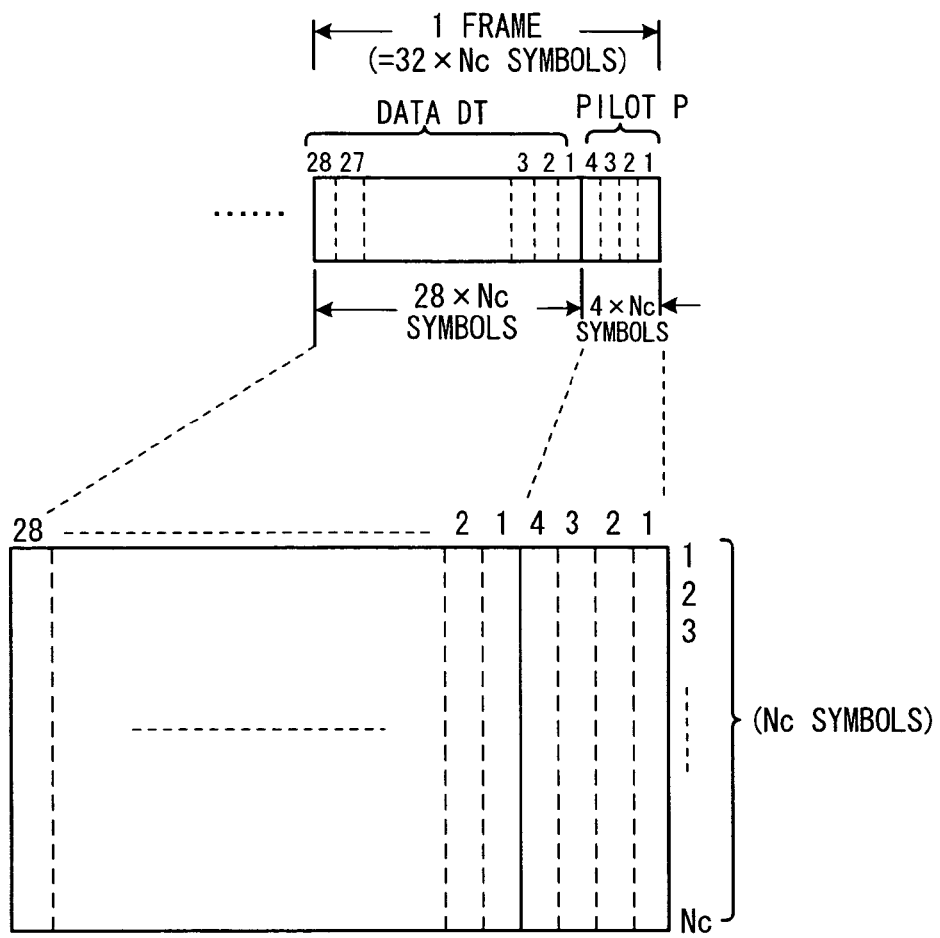
FIG. 2 is a diagram useful in describing a data format and a serial-to-parallel conversion of an S/P converter.

FIG. 2 is a diagram useful in describing a data format and the serial-to-parallel conversion performed by the S/P converter 13. Here one frame is composed of 32×Nc symbols in which a pilot P has been time-multiplexed to the forward end of transmit data DT. The pilot P per frame is composed of, e.g., 4×Nc symbols and the transmit data is composed of 28×Nc symbols. The S/P converter 13 outputs Nc symbols of the pilot the first four times as parallel data and subsequently outputs Nc symbols of the transmit data 28 times as parallel data. As a result, an OFDM symbol comprising four pilot symbols can be transmitted in one frame interval, the propagation path (channel) can be estimated on the receiving side using these pilot symbols and channel compensation (fading compensation) becomes possible.

Figure 3:
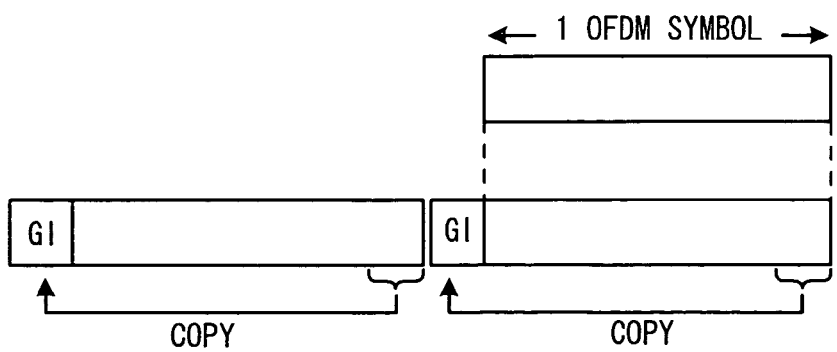
FIG. 3 is a diagram useful in describing insertion of a guard interval.

FIG. 3 is a diagram useful in describing insertion of a guard interval. If an IFFT output signal conforming to N-number of subcarrier samples (=1 OFDM symbol) is adopted as one unit, insertion of the guard interval signifies copying the tail-end portion of the signal to the leading end thereof. By inserting a guard interval GI, it is possible to eliminate the effects of intersymbol interference (ISI) caused by multipath.

With reference again to FIG. 1, the OFDM receiver 30 includes a bandpass filter (BPF) 31 that removes unwanted frequency components by applying filtering to the signal received by an antenna ATR; a downconverter (D/C) 32 for frequency-converting the radio signal to a baseband frequency; an analog/digital converter (not shown) for converting the analog baseband signal to digital data; a guard-interval removal unit 33 for removing a guard interval; and an S/P converter 34 for converting N-number of items of time-series data, from which the guard interval has been removed, to parallel data and inputting a receive-signal vector $$(\overline{R}_t)$$

to a propagation path estimation unit 35 and propagation path compensator 36. By way of a method (described later) using pilot symbols, the propagation path estimation unit 35 calculates the following propagation-path response vector comprising N-number of items of time-series elements:

$$(\overline{h}_t)$$

The propagation path compensator 36 multiplies the N-number of items of time-series data of the receive-signal vector $$(\overline{R}_t)$$

by each element of the following propagation-path response complex conjugate vector:

$$(\overline{h}_t^*)$$

An N-point Fourier transform unit 37 applies N-point FFT processing to N-number of items of time-series data that has undergone propagation path compensation, thereby outputting Nc-number of subcarrier components. A P/S converter 38 outputs the Nc-number of subcarrier components serially in order, a demodulator 39 demodulates the input signal by, e.g., QPSK, and a decoder 40 decodes the input data after deinterleaving is performed and outputs the decoded signal.

(a) First Configuration of Propagation Path Estimation Unit

Figure 4:
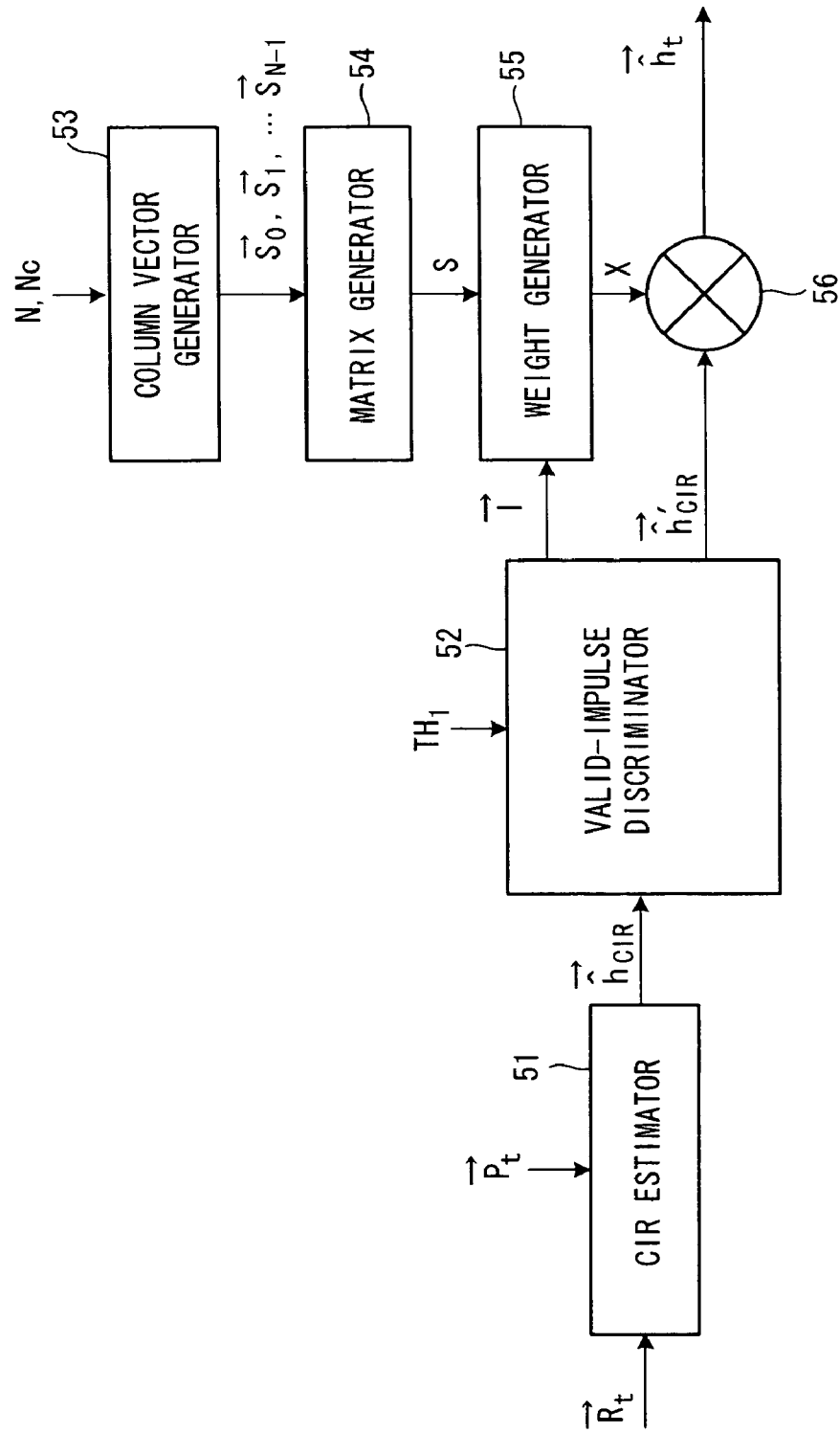
FIG. 4 is a block diagram of a propagation path estimation unit.

FIG. 4 is a block diagram of the propagation path estimation unit 35. The propagation path estimation unit 35 includes a CIR estimator 51 for estimating propagation-path impulse response (channel impulse response) CIR using the receive-signal vector ($\overline{R}_t$)

and a pilot-signal vector ($\overline{P}_t$)

and outputting a CIR estimation vector ($\hat{h}_{CIR}$)

The propagation path estimation unit further includes a valid-impulse discriminator 52 that compares each CIR element of the CIR estimation vector ($\hat{h}_{CIR}$) with a threshold value TH1, maintains CIR elements above the threshold value TH1 and makes zero the CIR elements below the threshold value TH1 (i.e., makes these CIR elements non-existent); a column vector generator 53 for generating column vectors of an S matrix (described later) using Nc and N; an S-matrix generator 54 for generating an S matrix using the column vectors; a weight generator 55 for calculating an inverse matrix $S^{-1}$ of the S matrix as a weight matrix X; and a multiplier 56 for multiplying the CIR estimation value by a weight and outputting a propagation-path response vector ($\overline{h}_t$)

The operation of each of these units will be described using mathematical expressions.

(a-1) Calculation of CIR Estimation Vector

In communication using an OFDM transmission scheme, pilot signals (pilot symbols) that usually have equal power are disposed in the frequency domain and CIR is estimated using these pilot signals. A signal vector ($\overline{P}_f$)

in the frequency domain of a pilot signal and a signal vector ($\overline{P}_t$)

in the time domain are written as follows, respectively:

$$\overline{P}_f = [P_f(0) P_f(1) \ldots P_f(N-1)]^T \quad (1)$$

$$\overline{P}_t = [P_t(0) P_t(1) \ldots P_t(N-1)]^T \quad (2)$$

where T represents a transposed matrix. The power of each element of $\overline{P}_f$ takes on a value of 0 or 1. Specifically, N represents the IFFT size. The power of Nc-number of subcarrier signals that transmit a pilot signal is 1, and the power of (N-Nc)-number of subcarrier signals that do not transmit a pilot signal is 0.

The relationship between $\overline{P}_f$ and $\overline{P}_t$ is as follows:

$$P_t(k) = \mathfrak{I}^{-1}\{\overline{P}_f\} = \frac{1}{N} \sum_{n=0}^{N-1} P_f(n) e^{j2\pi kn/N} \quad (3)$$

where $\mathfrak{I}^{-1}$ indicates IFFT processing of a number N of samples.

The true propagation-path response vector ($\overline{h}_t$)

in the time domain and additive noise ($\overline{w}$)

are written as follows, respectively:

$$\overline{h}_t = [h_t(0) h_t(1) \ldots h_t(N-1)]^T \quad (4)$$

$$\overline{w} = [w_t(0) w_t(1) \ldots w_t(N-1)]^T \quad (5)$$

If it is assumed that eight propagation paths $PT_0$ to $PT_7$ (multipath) exist between the transmitter 10 and receiver 30, as illustrated at (A) in FIG. 5, then ($\overline{h}_t$)

will be the propagation-path response vector of each path. This propagation-path response vector is illustrated at (B) in FIG. 5, by way of example. For the sake of simplicity, it is assumed that there is no intersymbol interference and therefore the guard interval (GI) of the pilot signal will be described as having a length greater than the data symbol length.

The receive-signal vector ($\overline{R}_t$)

in the time domain can be expressed as follows:

$$\overline{R}_t = [R_t(0) R_t(1) \ldots R_t(N-1)]^T \quad (6)$$

$$R_t(k) = \sum_{n=0}^{N-1} h_t(n) P_t(k-n) + w(k) \quad (7)$$

Figure 6:
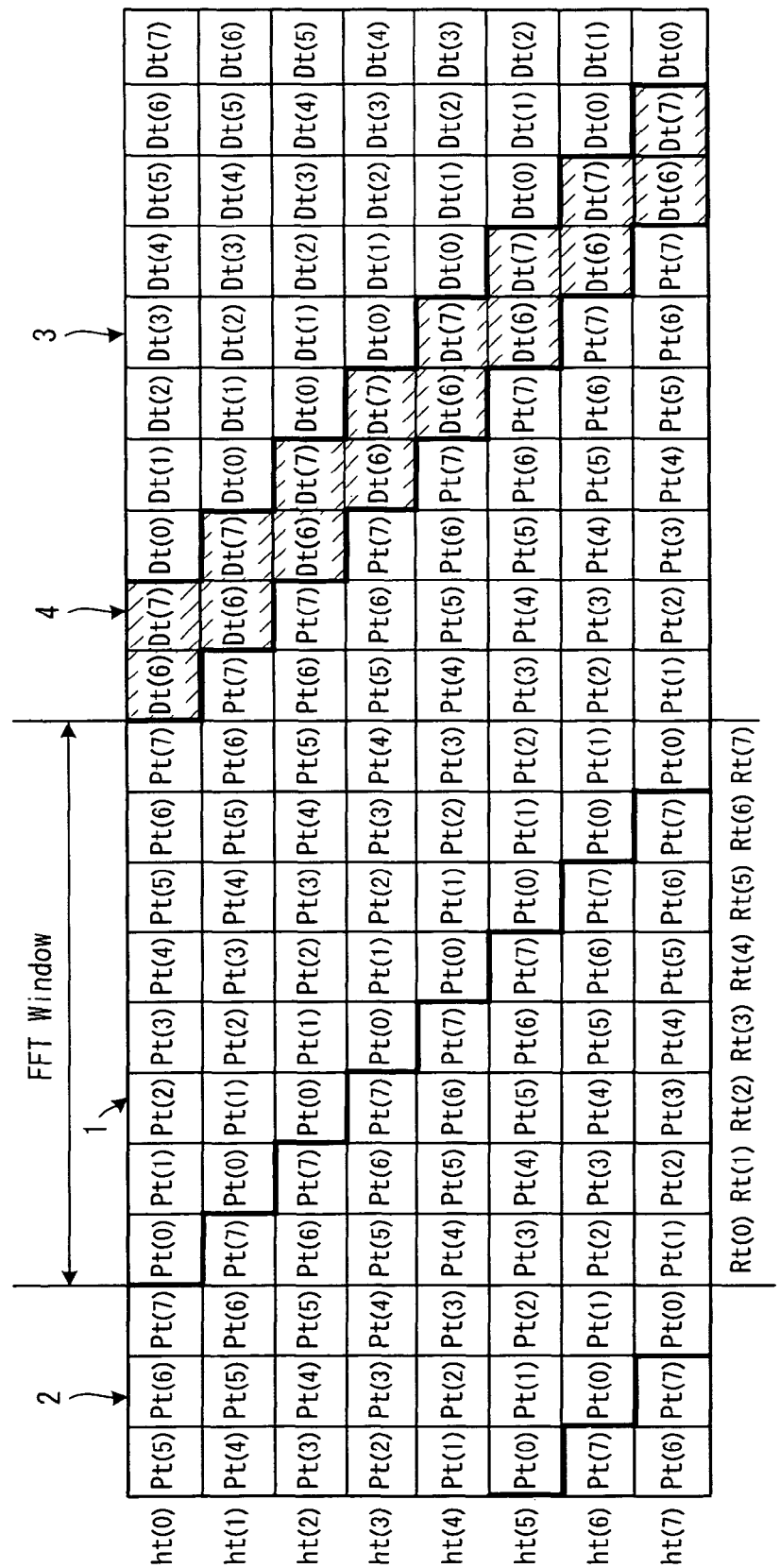
FIG. 6 is a diagram useful in describing a receive-signal vector in a case where N=8 holds.

FIG. 6 illustrates a case where N=8 holds. Additive noise, however, is ignored. The uppermost sequence in FIG. 6 is a time-series signal that arrives at the receiver 30 via path $PT_0$, the second sequence is a time-series signal that arrives at the receiver 30 via path $PT_1$, and an (i+1)th sequence is a time-series signal that arrives at the receiver 30 via path $PT_i$. Further, Pt(j) represents a pilot, Dt(j) denotes data, 1 signifies a signal in the time domain of the pilot signal, 2 the GI of the pilot signal, 3 a data signal that follows the pilot signal, and 4 the GI of the data signal.

If the GI of the pilot signal is greater than the length of the data symbol, as mentioned above, then cyclic convolution is assured in the receive signal within the FFT window. For this reason, the receive-signal vector ($\overline{R}_t$)

can be expressed as the following matrix:

$$\begin{bmatrix} R_t(0) \\ R_t(1) \\ \cdots \\ R_t(N-1) \end{bmatrix} = \begin{bmatrix} P_t(0) & P_t(N-1) & \cdots & P_t(1) \\ P_t(1) & P_t(0) & \cdots & P_t(2) \\ \cdots & \cdots & \cdots & \cdots \\ P_t(N-1) & P_t(N-2) & \cdots & P_t(0) \end{bmatrix} \cdot \begin{bmatrix} h_t(0) \\ h_t(1) \\ \cdots \\ h_t(N-1) \end{bmatrix} + \begin{bmatrix} w_t(0) \\ w_t(1) \\ \cdots \\ w_t(N-1) \end{bmatrix} \quad (8)$$

This receive-signal vector is input to the CIR estimator 51 of FIG. 4.

The channel impulse response CIR can be estimated, as indicated below, from Equation (8) by sliding correlation using the receive-signal vector $$(\overline{R}_t)$$

and known pilot-signal vector $$(\overline{P}_t)$$

Specifically, the CIR estimation vector becomes as follows:

$$\hat{\overline{h}}_{CIR} = [\hat{h}_{CIR}(0)\hat{h}_{CIR}(1) \ldots \hat{h}_{CIR}(N-1)]^T \quad (9)$$

$$\hat{h}_{CIR}(k) = \sum_{n=0}^{N-1} R_t(n) P_t^*(k-n) \quad (10)$$

The upper equation becomes as follows when expressed by a matrix:

$$\begin{bmatrix} \hat{h}_{CIR}(0) \\ \hat{h}_{CIR}(1) \\ \cdots \\ \hat{h}_{CIR}(N-1) \end{bmatrix} = \begin{bmatrix} P_t^*(0) & P_t^*(1) & \cdots & P_t^*(N-1) \\ P_t^*(N-1) & P_t^*(0) & \cdots & P_t^*(N-2) \\ \cdots & \cdots & \cdots & \cdots \\ P_t^*(1) & P_t^*(2) & \cdots & P_t^*(0) \end{bmatrix} \cdot \begin{bmatrix} R_t(0) \\ R_t(1) \\ \cdots \\ R_t(N-1) \end{bmatrix} \quad (11)$$

This can be transformed as follows:

$$\hat{\overline{h}}_{CIR} = P_t^* \cdot \overline{R}_t = P_t^* \cdot (P_t \overline{h}_t + \overline{w}) = P_t^* \cdot P_t \overline{h}_t + P_t^* \cdot \overline{w} \quad (12)$$

where $P_t$ is written as follows:

$$P_t = \begin{bmatrix} P_t(0) & P_t(N-1) & \cdots & P_t(1) \\ P_t(1) & P_t(0) & \cdots & P_t(2) \\ \cdots & \cdots & \cdots & \cdots \\ P_t(N-1) & P_t(N-2) & \cdots & P_t(0) \end{bmatrix} \quad (13)$$

The CIR estimator 51 estimates the CIR estimation vector $$(\hat{\overline{h}}_{CIR})$$

from Equation (11) and inputs this to the valid-impulse discriminator 52.

The foregoing has been described with regard to a CIR estimation method in the time domain, though similar processing is possible also in the frequency domain. That is, in the frequency domain, frequency-domain signal processing is executed using the following equation:

$$\hat{h}_{CIR}(k) = F^{-1}\left\{\frac{R_f(k)}{P_f(k)}\right\} = F^{-1}\left\{\frac{R_f(k)P_f^\phi(k)}{|P_f^\phi(k)|^2}\right\}$$

instead of Equation (10) of the time domain. Though $0 \leq k \leq N-1$ is the same as in the time domain, here k is a subcarrier number (k is a sample number in the time domain). In order to eventually execute IFFT in the processing of the frequency-domain signal of the above equation, the frequency signal enclosed by { } is converted to a time-domain signal and becomes the time-domain signal of Equation (10). Executing signal processing in the frequency domain is more advantageous than direct calculation in the time domain in that the standard of the circuitry is smaller.

(a-2) Discrimination of Valid Impulses

Each element $S_{ij}$ of $P_t^* \cdot P_t$ in the CIR estimation vector ($\hat{\overline{h}}_{CIR}$) can be expressed as follows:

$$S_{ij} = \sum_{n=0}^{N-1} P_t^*(n-i) \cdot P_t(n-j) \quad (14)$$

Furthermore, if a column is expressed as a vector (e.g., j=0), then Equation (14) can be transformed to an equation of a cyclic convolutional calculation as follows:

$$\overline{S}_0 = \sum_{n=0}^{N-1} P_t^*(n-i) \cdot P_t(n) \quad (15)$$

A cyclic convolutional calculation is equivalent to what is obtained by applying an IFFT to a product in a frequency device and therefore the above can be transformed to $$\overline{S}_0 \mathfrak{S}^{-1}\{\mathfrak{S}\{\overline{P}_t^*\} \cdot \mathfrak{S}\{\overline{P}_t^T\}\} = \mathfrak{S}^{-1}\{\overline{P}_f^* \cdot \overline{P}_f^T\} \quad (16)$$

Here $$\mathfrak{S}, \mathfrak{S}^{-1}$$

indicate FFT processing and IFFT processing, respectively. Because $$\overline{P}_f^* \cdot \overline{P}_f^T$$

is power of the pilot signal, this equation compensates for the information of each element of $$\overline{P}_f$$

and signifies that an untransmitted subcarrier becomes 0 and that a subcarrier used in transmission becomes 1.

By thus compensating for the information of each element of $$\overline{P}_f$$

the result will be that if an untransmitted subcarrier does not exist (i.e., if all elements of $$\overline{P}_f^* \cdot \overline{P}_f^T$$

are 1), then $$\overline{S}_0$$

will be an impulse, and if an untransmitted subcarrier does exist (i.e., if an element of $$\overline{P}_f^* \cdot \overline{P}_f^T$$

contains 0), then $$\overline{s}_0$$

will become a sinc function specified by N, Nc. In other words, since an end subcarrier is made an untransmitted subcarrier (i.e., since this subcarrier is not used in data transmission), the result is a rectangular function on the frequency axis. If this is subjected to an IFFT, it becomes a sinc function on the time axis. Accordingly, $$\overline{s}_0$$

is an even function and therefore can be expressed as follows:

$$\overline{s}_0 = [s(0)s(1) \ldots s((N/2)-1)s(N/2)s((N/2)-1 \ldots S(1)]^T \quad (17)$$

Figure 7:
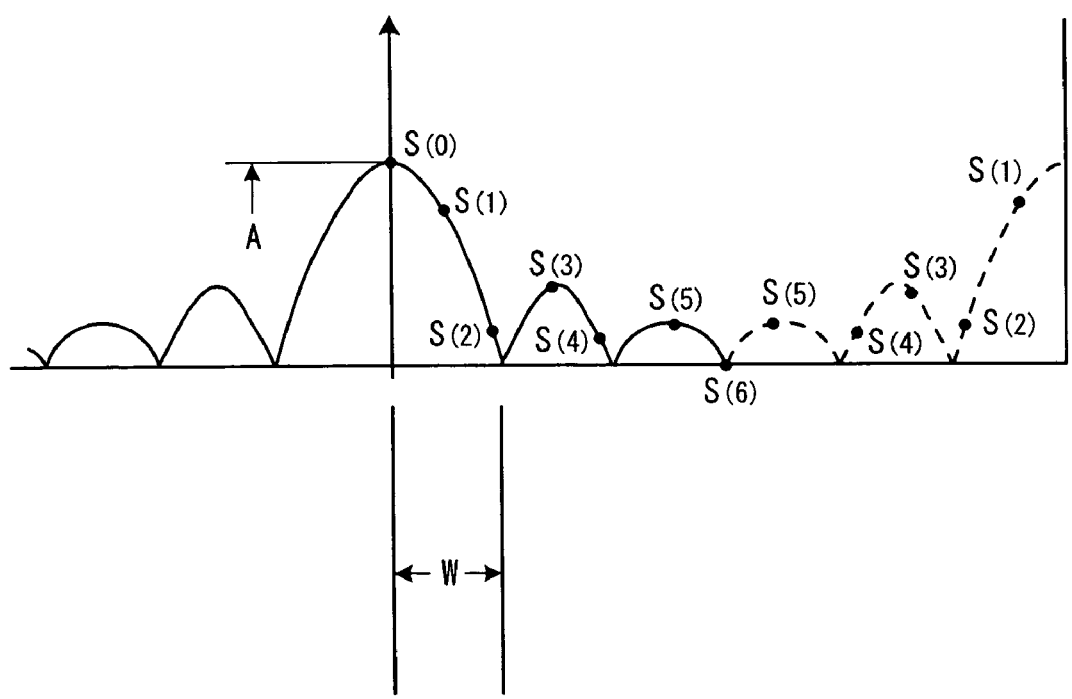
FIG. 7 is a diagram useful in describing the waveform of a sinc function.

FIG. 7 is a diagram useful in describing the waveform of a sinc function. A main lobe has a peak value A that is Nc/N and a width W that broadens as Nc decreases. In FIG. 7, items of time-series data S(0), S(1), ..., S(1) that prevail when the left half of the sinc function is folded over as indicated by the dashed line become the elements of the column vector $$\overline{s}_0$$

in Equation (17). A kth vector is a vector that results when $$\overline{s}_0$$

is shifted by k. Finally, $$S = P_t^* \cdot P_t$$

can be expressed as the matrix indicated below.

$$S = \begin{bmatrix} s(0) & s(1) & \cdots & \cdots & \cdots & \cdots & s(1) \\ s(1) & s(0) & \cdots & \cdots & \cdots & s((N/2)-1) & \cdots \\ \cdots & s(1) & \cdots & \cdots & \cdots & s(N/2) & s((N/2)-1) \\ s((N/2)-1) & \cdots & \cdots & \cdots & \cdots & \cdots & s(N/2) \\ s(N/2) & s((N/2)-1) & \cdots & \cdots & \cdots & s(1) & \cdots \\ \cdots & s(N/2) & \cdots & \cdots & \cdots & s(0) & s(1) \\ s(1) & \cdots & \cdots & \cdots & \cdots & s(1) & s(0) \end{bmatrix} \quad (18)$$

Figure 8:
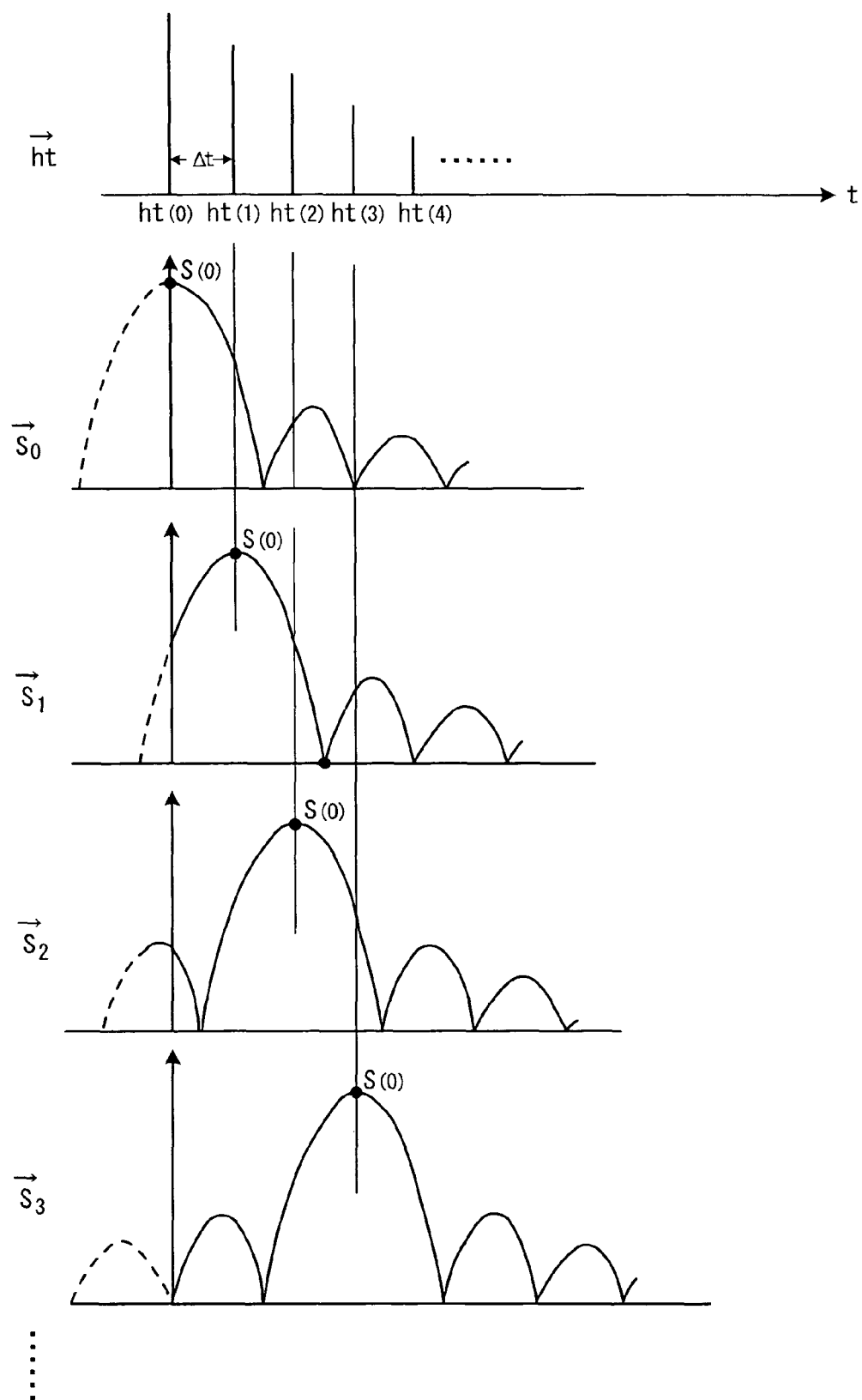
FIG. 8 is a diagram useful in describing the column vector of an S matrix.

Specifically, the column vectors $$\overline{s}_0, \overline{s}_1, \overline{s}_2, \ldots$$

in FIG. 18 are the result of shifting the sinc function of FIG. 7 successively by a time difference Åt of each element of the propagation-path response vector $$(\overline{h}_t)$$

in the manner shown in FIG. 8.

In view of the description thus far, the CIR estimation vector $$(\hat{h}_{CIR})$$

can be expressed as follows:

$$\hat{h}_{CIR} = P_t^* \cdot (P_t \cdot \overline{h}_t + \overline{w}) = P_t^* \cdot P_t \cdot \overline{h}_t + P_t^* \cdot \overline{w} = S \cdot \overline{h}_t + P_t^* \cdot \overline{w} \quad (19)$$

In other words, $\hat{h}_{CIR}$ can be considered to be the result of adding additive noise to the product obtained by multiplying S by the propagation-path response vector $$\overline{h}_t$$

Here

Figure 9:
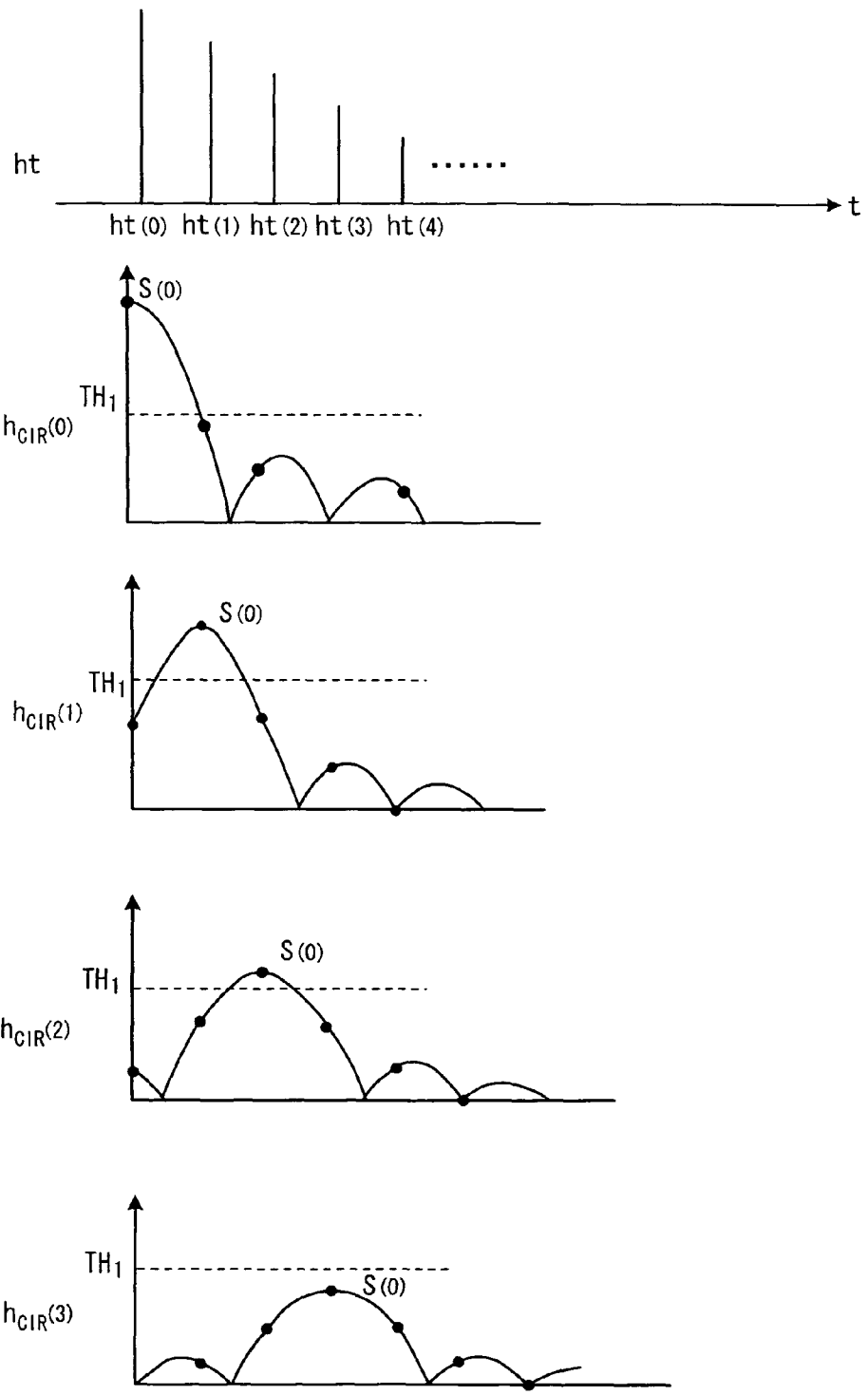
FIG. 9 is a diagram useful in describing the CIR elements of a CIR estimation vector.

S is formed by a vector having the shape of a sinc function and therefore takes on a value that becomes sharply smaller as distance increases from s(0), which is the peak value of the main lobe. FIG. 9 is a diagram useful in describing the CIR estimation vector in a case where $$\hat{h}_{CIR} = S \cdot \overline{h}_t$$

holds, and it will be understood this takes on a value that becomes sharply smaller as distance increases from s(0), which is the peak value of the main lobe. Accordingly, the information (energy) of the propagation path vector $$\overline{h}_t$$

is dispersed from the main lobe to a certain specific interval.

In view of the above, the CIR estimation vector $$(\hat{h}_{CIR})$$

calculated according to Equation (11) has the shape shown in FIG. 9. Accordingly, the valid-impulse discriminator 52 compares each CIR element (impulse) of the CIR estimation vector with the threshold value TH1, selects impulses that are greater than the threshold value TH1 and makes impulses below the threshold value non-existent (i.e. makes them zero). For example, assume that CIR element $h_{CIR}(3)=0$ holds in FIG. 9 so that propagation-path response is rendered non-existent. Further, 0 is substituted for samples other than a prescribed number m of samples bracketing the maximum peak value s(0) of the selected impulse. The threshold value TH1 is made power that is lower than the maximum peak value of the CIR by a value decided based upon the number N of points of the IFFT used in OFDM modulation and the number Nc of subcarriers used in actual transmission. Alternatively, the threshold value TH1 is made power that is greater than background noise power, which has been estimated by some method, by a predetermined value.

In other words, a set vector $$I$$

that indicates the sample position of an impulse response greater than a threshold value 1 is output to the weight generator 55 and $$\hat{h}_{CIR}$$

is output as $$\hat{h}_{CIR}$$

that is the result of degeneracy of size conforming to the set vector. The weight generator 55 generates and outputs the following weight matrix from the set vector $$I$$

and m:

$$X = \begin{bmatrix} 0 & & & & & \\ & 0 & & 0 & & \\ & & 1 & & & \\ & & & \ddots & & \\ & & & & 1 & \\ & 0 & & 0 & & \\ & & & & & 0 \end{bmatrix} \quad (19a)$$

Here the interval of 1 is an index represented by the set vector $$(I)$$

and is m in number before and after. The multiplier 56 multiplies $$\hat{\bar{h}}'_{CIR}$$

and the weight matrix X together, whereby zero is substituted for samples other than m-number of samples bracketing the selected impulse response.

As set forth above, the present invention is so adapted that each CIR element (impulse) of the CIR estimation vector $$(\hat{\bar{h}}_{CIR})$$

can be estimated independently, impulse responses greater than the threshold value TH1 are selected and these impulses can be expressed by the prescribed m-number of samples. As a result, the decline in energy is held to the minimum. This solves the problem encountered with the prior art, namely the inclusion of a permanent estimation error owing to the fact that the amplitude of the main lobe is Nc/N. It should be noted that the number m of samples is an already known value decided from the number N of points of the IFFT and the number Nc of subcarriers used in actual transmission.

(a-3) Generation of S Matrix, Generation of Weight and Calculation of Propagation-Path Response Vector In accordance with Equation (19), the propagation-path response vector $$\bar{h}_t$$

can be obtained by multiplying the CIR estimation vector $$\hat{\bar{h}}_{CIR}$$

by the inverse matrix of S. That is, the propagation-path response vector can be found according to the following equation:

$$\bar{h}_t = S^{-1} \cdot \hat{\bar{h}}_{CIR} = \bar{h}_t + S^{-1} \cdot P_t^* \cdot \bar{w} \quad (20)$$

Accordingly, the column vector generator 53 generates the column vectors $$\bar{S}_0, \bar{S}_1, \bar{S}_2, \ldots$$

of the S matrix of Equation (18) using Nc and N, the S-matrix generator 54 generates the S matrix using these column vectors, and the weight generator 55 calculates the inverse matrix $S^{-1}$ of the S matrix as the weight matrix. In accordance with Equation (20), the multiplier 56 multiplies the CIR estimation vector $$\hat{\bar{h}}_{CIR} (= \hat{\bar{h}}_{CIR})$$

which is output from the valid-impulse discriminator 52, by the weight and outputs the propagation-path response vector $$(\bar{h}_t)$$

It should be noted that since the sinc function is uniquely decided by N, Nc, the column vector generator 53 is capable of generating the column vectors $$\bar{S}_0, \bar{S}_1, \bar{S}_2, \ldots$$

based upon the sinc function. In this case, the column vector generator 53 previously calculates the column vectors $$\bar{S}_0, \bar{S}_1, \bar{S}_2, \ldots$$

that conform to Nc, N and stores the column vectors, whereby it can be so arranged that these column vectors are not calculated one by one. Further, according to $$S = P_t^* \cdot P_t$$

the column vector generator 53 can calculate the column vectors $$\bar{S}_0, \bar{S}_1, \bar{S}_2, \ldots$$

by a matrix operation between the matrix $$P_t$$

of Equation (13) and the conjugate transposed matrix $$P_t^*$$

and can input the column vectors to the S-matrix generator 54.

The valid-impulse discriminator 52 selects impulse responses above the threshold value (TH1) from the CIR estimation vector $$\hat{\bar{h}}_{CIR}$$

and makes zero the impulse responses below the threshold value to make them non-existent. The S-matrix generator 54 creates the S matrix making zero the matrix elements that conform to the impulse responses that have been made zero, thereby reducing the size of the matrix and making it possible to reduce calculations.

Thus, in accordance with the first propagation path estimation unit, each of the CIR elements of the CIR estimation vector $$\hat{\bar{h}}_{CIR}$$

can be estimated independently on a per-path basis. As a result, even if paths are close together and side lobes of the channel impulse response CIR of each of the paths overlap each other, a CIR below the threshold value TH1 can be discriminated correctly to be non-existent, thereby making it possible to obtain a propagation path estimation value in which background noise has been suppressed.

Further, since CIR is estimated using a prescribed number of samples from among the samples that constitute CIR above the threshold value TH1, the CIR estimation error, which is a problem with the second prior-art technique, can be reduced. Moreover, by making zero the unwanted side lobe portions, it is possible to perform propagation path estimation in which background noise has been suppressed.

(b) Second Configuration of Propagation Path Estimation Unit

Figure 10:
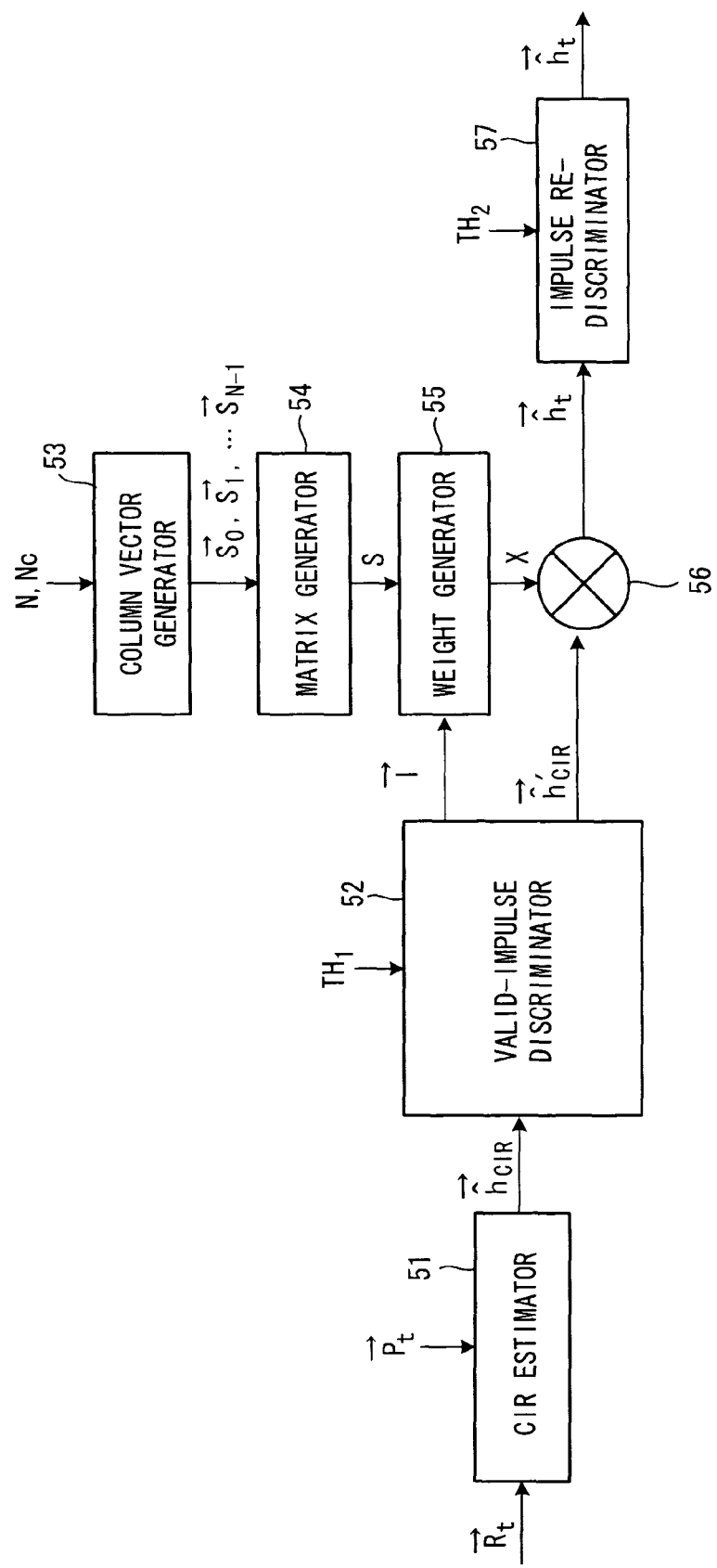
FIG. 10 is another block diagram of a propagation path estimation unit.
Figure 11:
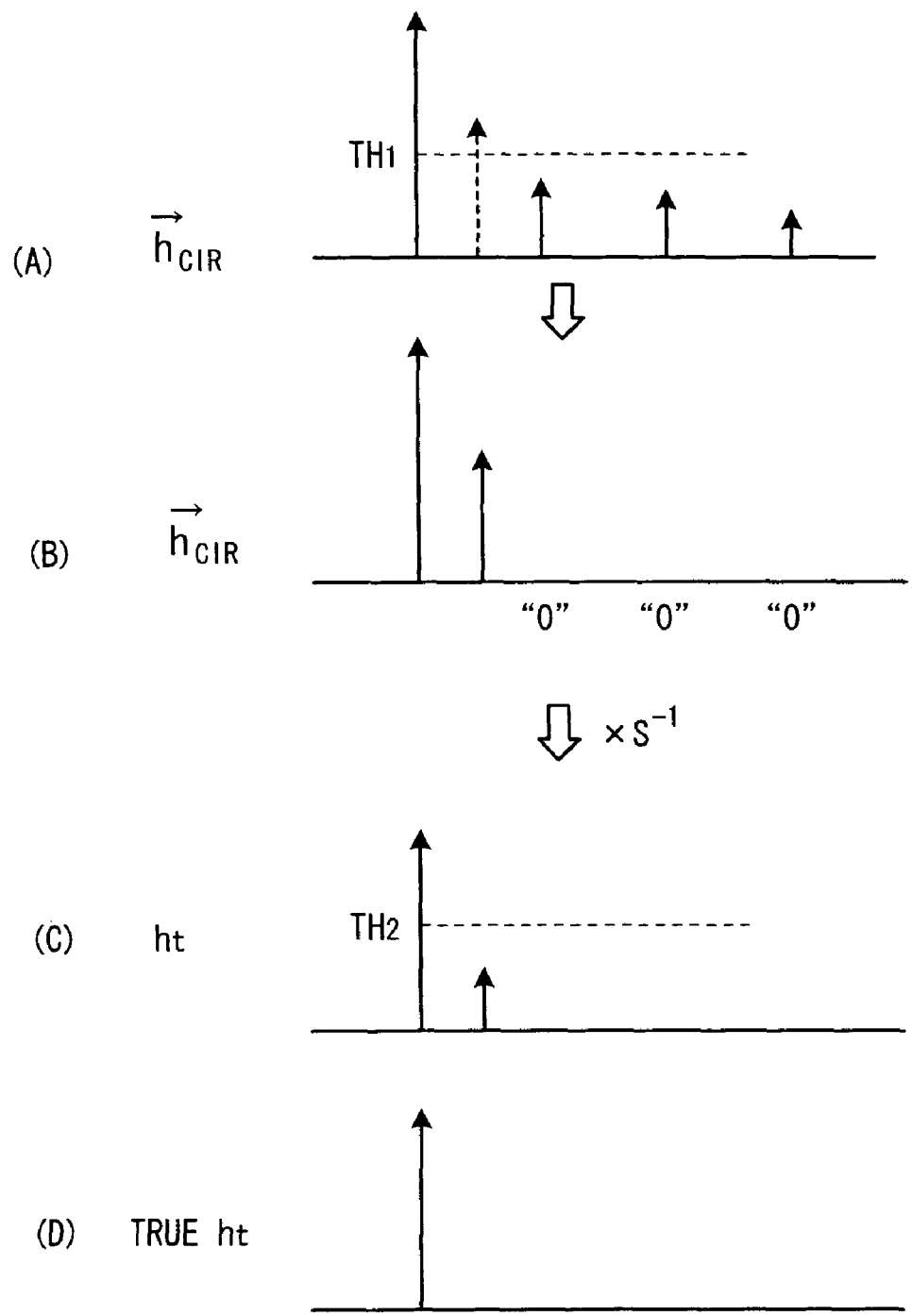
FIG. 11 is a diagram useful in describing the operation of a discriminator for re-discriminating impulses.

FIG. 10 is another block diagram of the propagation path estimation unit 35. This arrangement differs from that of FIG. 4 in that a discriminator 57 for re-discriminating impulses is provided. The discriminator 57 compares the propagation-path response vector $$\bar{h}_t$$

which has been obtained by calculating the inverse matrix, with a threshold value again, namely a threshold value TH2, makes zero the elements of the propagation-path response vector $$\bar{h}_t$$

that are below the threshold value TH2 and outputs the results. The reason for this is as follows: There are cases where the CIR estimation vector $$\hat{\bar{h}}'_{CIR}$$

selected by comparison with the threshold value in the valid-impulse discriminator 52 contains an impulse that exceeds this threshold value (TH1) owing to the effects of the side lobes of the sinc function, as indicated by the dash-line arrow at (A) in FIG. 11. This impulse is output as a valid impulse from the valid-impulse discriminator 52, as indicated at (B) in FIG. 11. This impulse does not actually exist. Accordingly, the discriminator 57 compares the propagation-path response vector $\overline{h}_t$ from which the effects of the side lobes have been eliminated, as indicated (C) in FIG. 11, with a threshold value again, this time the threshold value TH2, and substitutes zero for impulses that are below the threshold value TH2, as indicated at (D) in FIG. 11. As a result, in accordance with the propagation path estimation unit of FIG. 10, it is possible to suppress background noise further. It should be noted that the threshold value TH2 is decided in accordance with a criterion identical with that of the threshold value TH1 described above.

Figure 12:
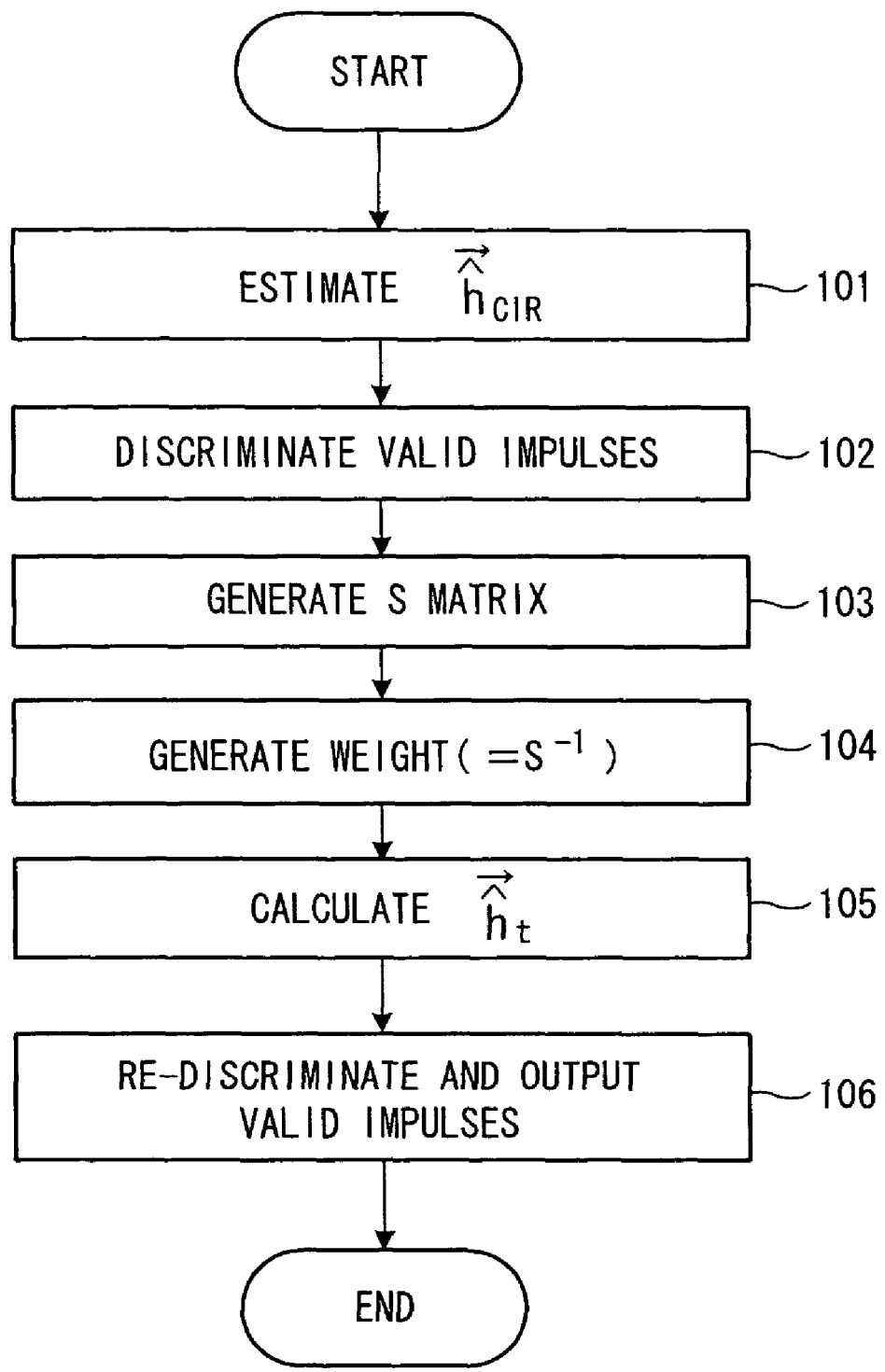
FIG. 12 is a flowchart of propagation path estimation processing executed by the propagation path estimation unit.

FIG. 12 is a flowchart of propagation path estimation processing executed by the propagation path estimation unit 35. The CIR estimator 51 estimates channel impulse response CIR using the receive-signal vector $(\overline{R}_t)$ and pilot-signal vector $(\overline{P}_t)$ and outputs the CIR estimation vector (step 101)

$(\hat{\overline{h}}_{CIR})$

The valid-impulse discriminator 52 compares each element of the CIR estimation vector $(\hat{\overline{h}}_{CIR})$ with the threshold value TH1, maintains CIR elements of the CIR estimation vector that are greater than the threshold value TH1, and makes zero the CIR elements below the threshold value TH1 (step 102). Next, the S-matrix generator 54 generates the S matrix (step 103). The weight generator 55 calculates, as the weight matrix X, the matrix decided by the set vector $\overline{I}$ and m, or the inverse matrix S−1 of the S matrix (step 104). The multiplier 56 multiplies the CIR estimation value by the weight and estimates the propagation-path response vector (step 105)

$(\overline{h}_t)$

The discriminator 57 compares the propagation-path response vector $\overline{h}_t$ which has been obtained by calculating the inverse matrix, with a threshold value again, namely the threshold value TH2, makes zero the elements of the propagation-path response vector $\overline{h}_t$ that are below the threshold value TH2 and outputs the results (step 106).

(c) Reduction in Calculations

In order to reduce the amount of calculation, Equation (19) is degenerated (S→S') only to an index related to the set vector $\overline{I}$ and it is possible to solve the inverse matrix. For example, in a case where impulses that have been selected by the valid-impulse discriminator 52 can be put into block form, the inverse matrix is split and generated block by block. This will be described for a case where N=4 holds. With regard to the CIR estimation vector $(\hat{\overline{h}}_{CIR})$ the following equation holds in view of Equation (19):

$$\begin{bmatrix} \hat{h}_{CIR}(0) \\ \hat{h}_{CIR}(1) \\ \hat{h}_{CIR}(2) \\ \hat{h}_{CIR}(3) \end{bmatrix} = \begin{bmatrix} s(0) & s(1) & s(2) & s(1) \\ s(1) & s(0) & s(1) & s(2) \\ s(2) & s(1) & s(0) & s(1) \\ s(1) & s(2) & s(1) & s(0) \end{bmatrix} \cdot \begin{bmatrix} h_t(0) \\ h_t(1) \\ h_t(2) \\ h_t(3) \end{bmatrix} + P_t^* \begin{bmatrix} w(0) \\ w(1) \\ w(2) \\ w(3) \end{bmatrix} \quad (21)$$

If we assume here that the CIR elements (impulses) of the CIR estimation vector that are greater than the threshold value are $h_{CIR}(0)$ and $h_{CIR}(1)$, then the above can be expressed by a matrix obtained by degenerating the matrix

S as follows:

$$\begin{bmatrix} \hat{h}_{CIR}(0) \\ \hat{h}_{CIR}(1) \end{bmatrix} = \begin{bmatrix} s(0) & s(1) \\ s(1) & s(0) \end{bmatrix} \cdot \begin{bmatrix} h_t(0) \\ h_t(1) \end{bmatrix} + P_t^* \begin{bmatrix} w(0) \\ w(1) \end{bmatrix} \quad (22)$$

where the following holds:

$$S' = \begin{bmatrix} S(0) & S(1) \\ S(1) & S(0) \end{bmatrix}, \hat{\overline{h}}'_{CIR} = \begin{bmatrix} \hat{h}_{CIR}(0) \\ \hat{h}_{CIR}(1) \end{bmatrix}, \overline{w} = \begin{bmatrix} w(0) \\ w(1) \end{bmatrix}$$

If Equation (21) can be transformed to Equation (22), then the amount of calculation for the inverse matrix can be reduced by a wide margin. Furthermore, even though the degenerate matrices become plural in number, there is no correlation among them and therefore it will suffice to solve the matrices individually.

The degenerate matrices thus obtained can be written as follows:

$$\hat{\overline{h}}'_{CIR} = S' \cdot \overline{h}_t + P_t'^* \overline{w}'$$

and therefore by multiplying by the inverse matrix

S' the propagation-path response vector $\overline{h}_t$ can be obtained as follows:

$$\overline{h}_t = S'^{-1} \hat{\overline{h}}'_{CIR} = \overline{h}_t + S'^{-1} \cdot P_t'^* \overline{w}'$$

In other words, the matrix S decided by N and Nc is generated by the S-matrix generator 54, and the weight generator 55 generates S' using the output $\overline{I}$ of the valid-impulse discriminator 52 and S from the S-matrix generator 54. Furthermore, the inverse matrix of S' is found and output to the multiplier 56 as the weight matrix X. The multiplier 56 obtains the propagation-path response vector $\overline{h}_t$ by multiplying $\hat{\overline{h}}'_{CIR}$ which is composed of the I component of $\hat{h}_{CIR}$ and the weight matrix X together. Further, in a case where CIRs above the threshold value are only $\hat{h}_{CIR}(0)$ or in a case where selected impulses are spaced apart, Equation (21) becomes as follows:

$$\hat{h}CIR(0)=s(0)\cdot h_t(0)+P_t^*(0)\cdot w(0) \quad (23)$$

In such case, it will suffice to divide $\hat{h}_{CIR}(0)$ by s(0) without finding the inverse matrix, thereby making it possible to reduce the amount of calculation. Further, since s(0) is Nc/N, we have the following:

$$h_t(0) = \hat{h}_{CIR}(0)\frac{N}{Nc}$$

This is equivalent to a solution to the problem of the prior art, namely that the amplitude of the main lobe becomes Nc/N and results in inclusion of a permanent estimation error.

In summation, if propagation path impulse responses (CIRs) above a threshold value can be divided into a plurality of blocks, then the matrix expression is divided up block by block to obtain the propagation-path response vector. In this case, if there is even a single propagation path-impulse response (CIR) that belongs to the blocks, then the propagation-path response vector is found by multiplying the CIR estimation vector by a fixed value, which is decided by the number N of points of the IFFT and number Nc of subcarriers used in signal transmission, without generating a matrix expression.

The amount of calculation involving the inverse matrix changes by a wide margin in dependence upon the number of CIR elements above the threshold value in the CIR estimation vector ($\hat{h}_{CIR}$)

Accordingly, the propagation path is estimated in accordance with a method in which the amount of calculation is reduced in dependence upon the state of the CIRs.

(d) Other Implementation of Weight Calculation

As set forth above, weight calculation is performed based upon the inverse of the S matrix and multiplication by the CIR estimation vector ($\hat{h}'_{CIR}$)

is performed to calculate the propagation-path response vector $\bar{h}_t$

However, in order to diminish the influence of additive noise, a method of obtaining weight based upon the standard of MMSE (Minimum Mean Square Error) is conceivable. A method of calculating weight based upon the MMSE method will be described below.

If we write $\hat{h}_t = X \cdot \hat{h}'_{CIR}$ then the weight matrix

X that minimizes the evaluation function $$J = E\left[\left|\hat{h}_t - \bar{h}_t\right|^2\right] \quad (24)$$

is found by solving $$\frac{\partial J}{\partial X} = 0 \quad (24a)$$

In Equation (24), J represents an evaluation function, E an expected value, $\hat{h}_t$ an estimated value and $\bar{h}_t$ the actual propagation-path response vector. If Equation (24a) is solved, then the weight vector matrix is given by $$X = \frac{S^*}{|S|^2 + \|\bar{P}_t^*\|^2 \cdot \sigma^2 \cdot I} \quad (25)$$

where $\|\cdot\|^2$ represents the norm of the square of the vector, $\sigma^2$ the variance of additive noise and I a unit vector.

Figure 13:
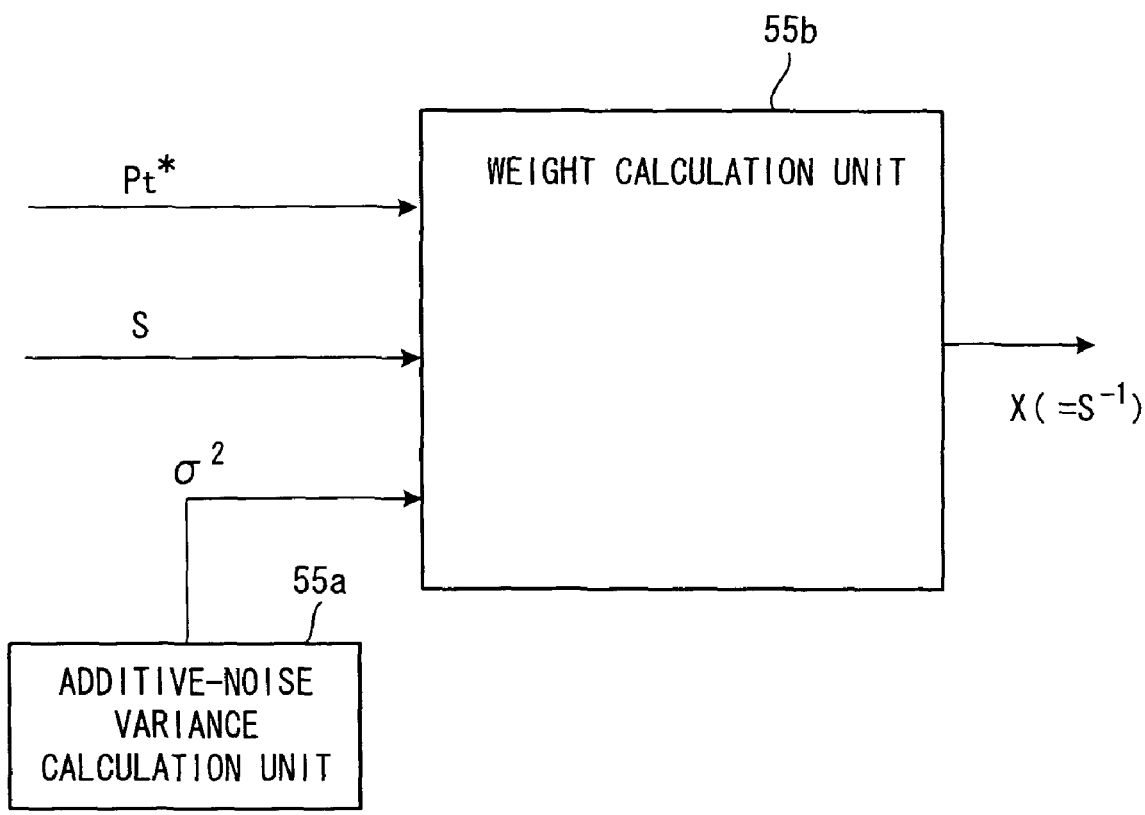
FIG. 13 is a block diagram illustrating a weight generator for calculating weight based upon the MMSE method.

FIG. 13 is a block diagram illustrating a weight generator for calculating weight based upon the MMSE method. A variance calculation unit 55a calculates variance of the additive noise, and a weight calculation unit 55b calculates the weight matrix X according to Equation (25) and outputs the same. If the statistical properties of noise are understood, weight that takes noise into consideration can be calculated according to Equation (25) and a propagation-path response vector $\bar{h}_t$ of higher precision can be output.

(B) Second Embodiment

Figure 14:
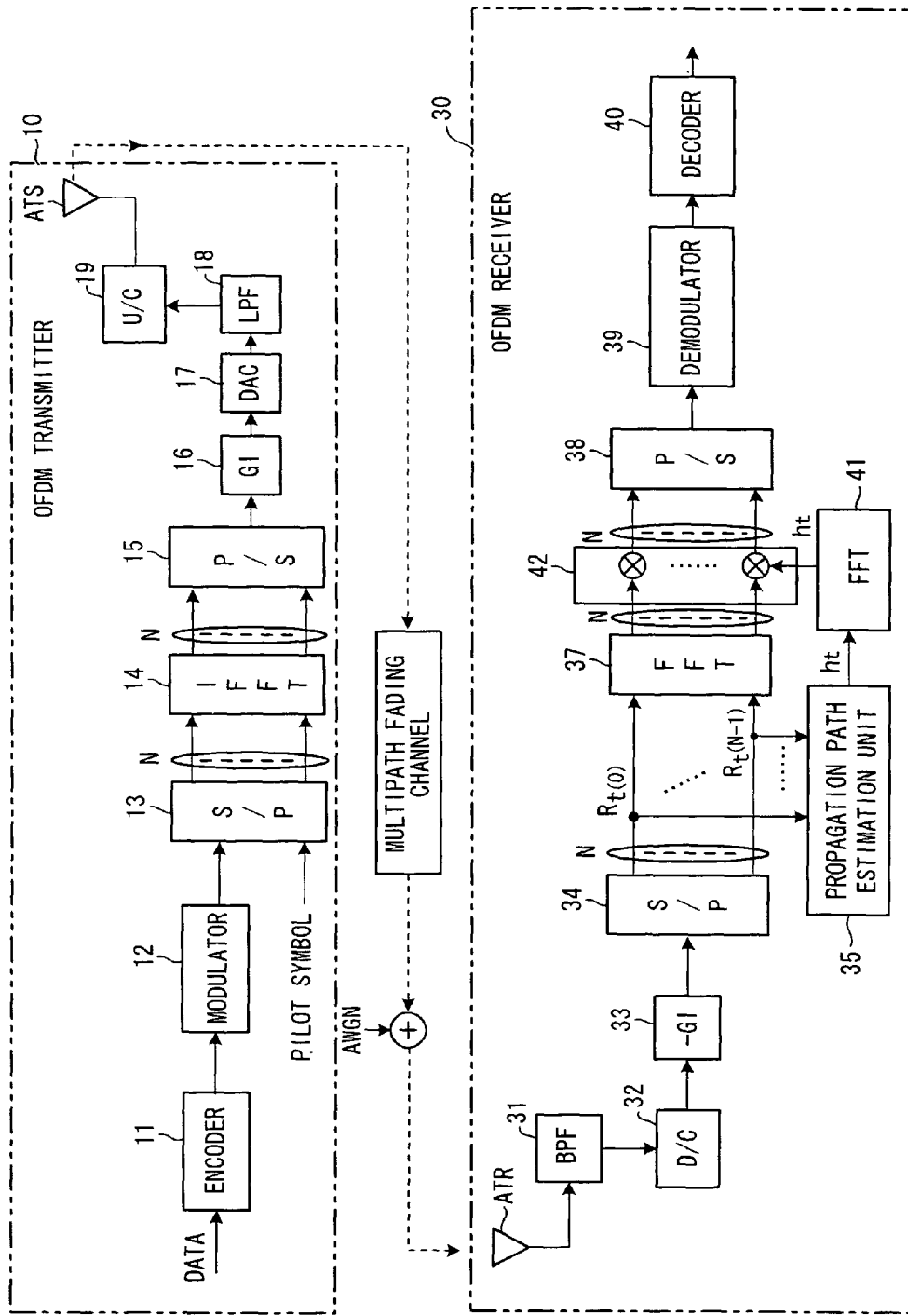
FIG. 14 is a block diagram illustrating a second embodiment of an OFDM communication system having a propagation path estimation unit according to the present invention.
Figure 15:
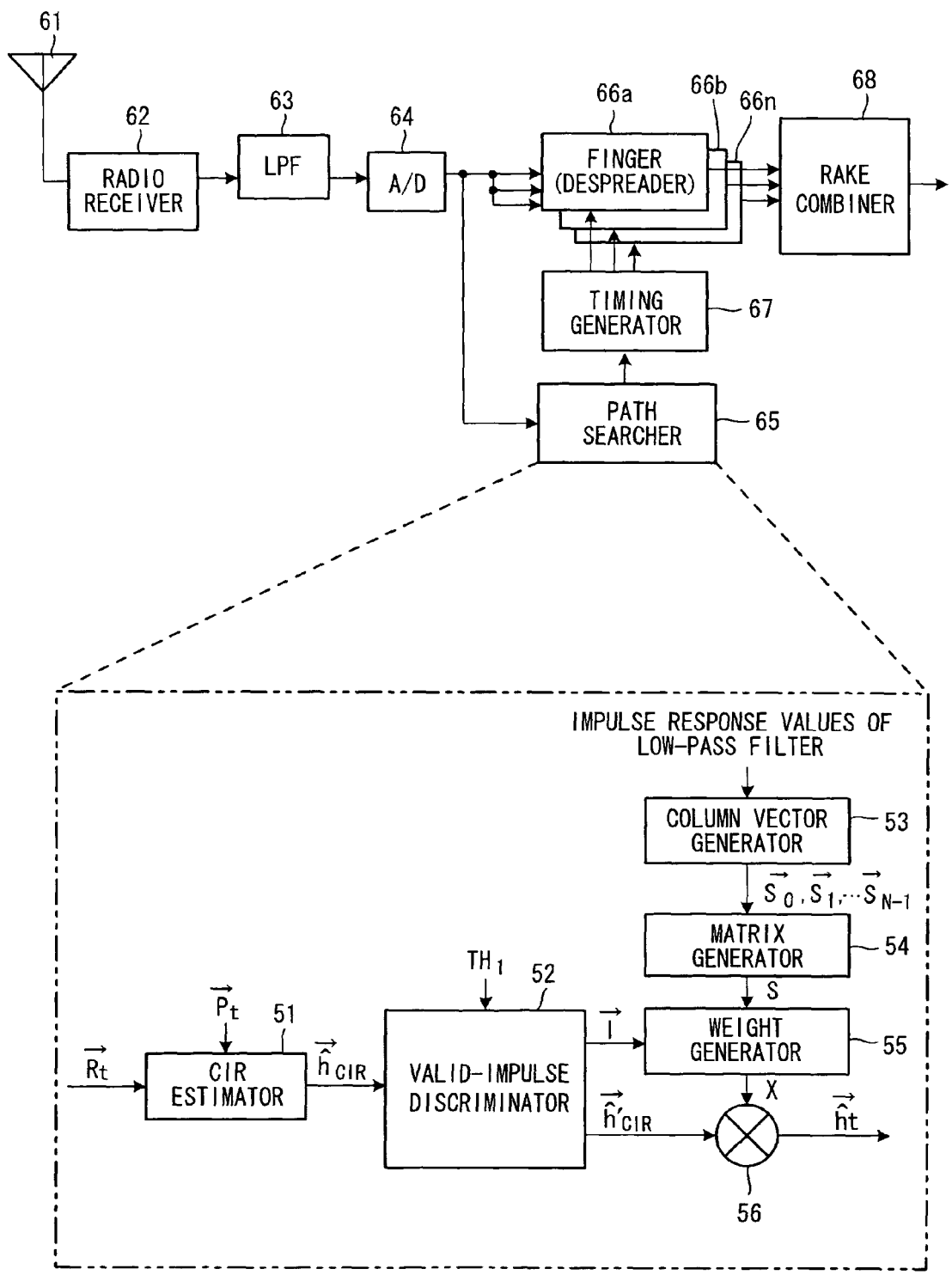
FIG. 15 is a block diagram illustrating a third embodiment in which a propagation path estimation unit according to the present invention is applied to path search of a RAKE receiver.

FIG. 14 is a block diagram illustrating a second embodiment of an OFDM communication system having a propagation path estimation unit according to the present invention. Components in FIG. 14 identical with those of the first embodiment of FIG. 1 are designated by like reference characters. This embodiment differ in the following points:

(1) A Fourier transform unit 41 is provided for applying FFT processing to the time-domain propagation-path response vector $\hat{h}_t$ that is output from the propagation path estimation unit 35, and for outputting a propagation-path response vector in the frequency domain $\hat{h}_f$ (2) A propagation path compensator 42 is provided for performing channel compensation by multiplying the Fourier-transformed receive-signal vector $\bar{R}_f = [0 \ldots 0 R_f(0) R_f(1) \ldots R_f(N-1) 0 \ldots 0]^T$ in the frequency domain by a propagation-path response complex conjugate vector $\tilde{h}^*_f$ i.e., based upon $R_f(i) \cdot \tilde{h}^*_f, 0 \leq i \leq N_c - 1$ (C) Third Embodiment The foregoing relates to a case where the present invention is applied to estimation of propagation path in an OFDM receiver. However, the present invention is also applicable to path search in a RAKE receiver of a CDMA (Code Division Multiplex Access) scheme. FIG. 15 is a block diagram illustrating a third embodiment in which the present invention is applied to path search of a RAKE receiver.

A radio receiver 62 frequency-converts a high-frequency signal, which has been received by an antenna 61, to a baseband signal and applies quadrature demodulation. A low-pass filter (LPF) 63 removes unwanted frequency components and inputs the resultant signal to an AD converter 64. The latter converts the input quadrature-demodulated signal to digital data, and a path searcher 65 searches a receive signal Rt for paths constituting a multipath system. Fingers 66a to 66n are provided for corresponding ones of paths of the multipath system and each has a despreader and a delay circuit. A timing generator 67 inputs the delay timings of the paths to the despreaders of respective ones of the fingers 66a to 66n as despreading timings and inputs delay times, which are for matching the timings of the despread signals that are output from the despreaders, to the delay circuits of respective ones of the fingers 66a to 66n. A RAKE combiner 68 applies maximal ratio combining to the despread signals that are output from the fingers 66a to 66n and outputs the combined signal to a channel codec (not shown), which is the next stage.

The path searcher 65, which has a structure identical with that of the propagation path estimation unit of FIG. 4, calculates the propagation-path response vector $\tilde{h}_t$ through the same method and performs a path search. This arrangement differs in that when a column vector of the S matrix is generated, impulse response of the low-pass filter 63 is used instead of $\bar{s}_0$ This can be applied using impulse response values of a cosine roll-off filter stipulated by standardization (3GPP) of CDMA, by way of example. That is, since a sinc function is uniquely decided by $W_{LPF}$, $W_{CDMA}$, the S matrix is created based upon the sinc function.

It should be noted that in all of the embodiments above, impulse responses above a predetermined threshold value are selected from an impulse-response group of an estimated propagation path and zero is substituted for samples other than a prescribed number of samples before and after the largest peak in the selected impulse responses. However, in an operation involving a floating decimal point or fixed decimal point, for example, it will suffice to use values in which the LSB is made "1" and the other bits are made "0", or values substantially handled as zero as in a null state, etc.

Similarly, among elements of a propagation-path response vector obtained by multiplying the CIR estimation vector by an inverse matrix of the S matrix, elements below the threshold value are made zero in estimating the propagation path. However, in an operation involving a floating decimal point or fixed decimal point, for example, it will suffice to use values in which the LSB is made "1" and the other bits are made "0", or values substantially handled as zero as in a null state, etc.

(D) Results of Simulation

The effects of the present invention will be made clear by simulations while comparing it with the second prior-art technique.

(a) First Simulation

A first simulation deals with a case where the number of paths of a multipath environment is small and path spacing is large. FIG. 16 illustrates simulation parameters in the first simulation. In the transmission model, the number of paths is two, the reception levels of the two paths are identical, the delay time between the two paths is 1 sample per 300 samples, and the fading frequency is 960 Hz. Further, the threshold value TH1 is −15 dB from the peak power in the CIR. This is a value decided by Nc (=896) and N (=1024).

FIG. 17 illustrates an Eb/N0 vs. MSE (Mean Square Error) characteristic without background-noise suppression processing, according to the prior art and according to the present invention. The present invention relates to a case where the propagation-path response vector $(\tilde{h}_t)$ has been estimated according to Equation (22). In FIG. 17, the curve A is the characteristic in a case where processing for suppressing background noise is not executed, the curve B is the characteristic in a case where the prior art is applied, and the curve C is the characteristic in a case where the present invention is applied. According to these characteristics, the prior art exhibits a background-noise suppression capability in an environment where Eb/N0 is poor. In an environment where Eb/N0 is favorable, however, a permanent estimation error is included and therefore no improvement in characteristic is seen. With the present invention, on the other hand, the characteristic improves as Eb/N0 increases and therefore the invention is effective in suppressing background noise. Further, simulation conditions indicate effectiveness even in a case where the path spacing is very small or in an environment in which normalized delay spread is large (about 0.14).

(b) Second Simulation

A second simulation deals with a case where the number of paths of a multipath environment is large and path spacing is small. This indicates that the present invention is effective even in a transmission environment in which paths are close together. FIG. 18 illustrates simulation parameters in the second simulation. In the transmission model, the number of paths is 12, the reception levels of the paths diminish exponentially in accordance with delay time, the path spacing is one sample and the fading frequency is 80 Hz. Further, the threshold value TH1 in the present invention is −15 dB from the peak power in the CIR.

FIG. 19 illustrates a delay spread vs. Eb/N0 characteristic that satisfies BER=$10^{-3}$. In FIG. 19, the curve A is the characteristic in a case where processing for suppressing background noise is not executed, the curve B is the characteristic in a case where the transmission path is known (Perfect), the curve C is the characteristic when frequency averaging is has been applied to five adjacent subcarriers in the prior art, the curve D is the characteristic according to the present invention, in which the propagation-path response vector $(\tilde{h}_t)$ has been estimated according to Equation (23), and the curve E is the characteristic according to the present invention when the propagation-path response vector has been estimated according to the Equation (20).

It will be understood from the characteristic of the prior art that a delay spread for which the algorithm of the prior art is optimized exists. Under the present conditions, a delay spread of 0.111 us is the optimum value and the difference relative to the known propagation path characteristic B (Perfect) is about 0.3 dB. However, the characteristic worsens with distance from the optimum value and is degraded to about 4.5 dB at a delay spread of 0.667 us. On the other hand, the characteristic D of the present invention is such that under conditions where the delay spread is small, degradation from the known propagation path characteristic B occurs owing to the influence of the adjacent paths and becomes about 0.6 dB. However, degradation becomes 0.2 dB under conditions where the delay spread is large. Further, the characteristic E of the present invention is such that the difference is always about 0.1 dB, regardless of the delay spread. Thus it is confirmed that background noise can be suppressed ideally.

Thus, in accordance with the present invention applied to communication using OFDM-based modulation in which subcarriers not used in data transmission exist, even if a delayed wave that exceeds a guard interval is generated, it is possible to obtain a propagation path estimation value in which background noise is suppressed to a level equivalent to that in a case where the propagation path is known.

(E) Fourth Embodiment

In the above embodiment, S is defined as the cyclic sinc function matrix determined by the relation between the number $N_C$ of propagation subcarriers and the number N of IFFT points used in OFDM modulation, that is, the number N of FFT points used in demodulation; in a fourth embodiment, S is defined as the cyclic time response function matrix determined by the relation between the above $N_C$ and M×N, which is an integral multiple of the number N of FFT points used in demodulation. In other words, the fourth embodiment is an extension of the first and second embodiments, with the case of M=1 corresponding to the first and second embodiments. In the first and second embodiments, a limited representation in terms of the sinc function is employed; this is a time response function in which the positions of subcarriers which do not propagate are placed at both edges. When there is no propagation at subcarrier positions other than the edges, the time response vector of the matrix S takes on a different form. Even if the form of a time response function is not itself known, all the discrete time response values of the time response function are obtained through actual IFFT, so that the matrix can be created by the same method used for matrix S creation explained in the first embodiment, and so remains a known quantity.

Figure 20:
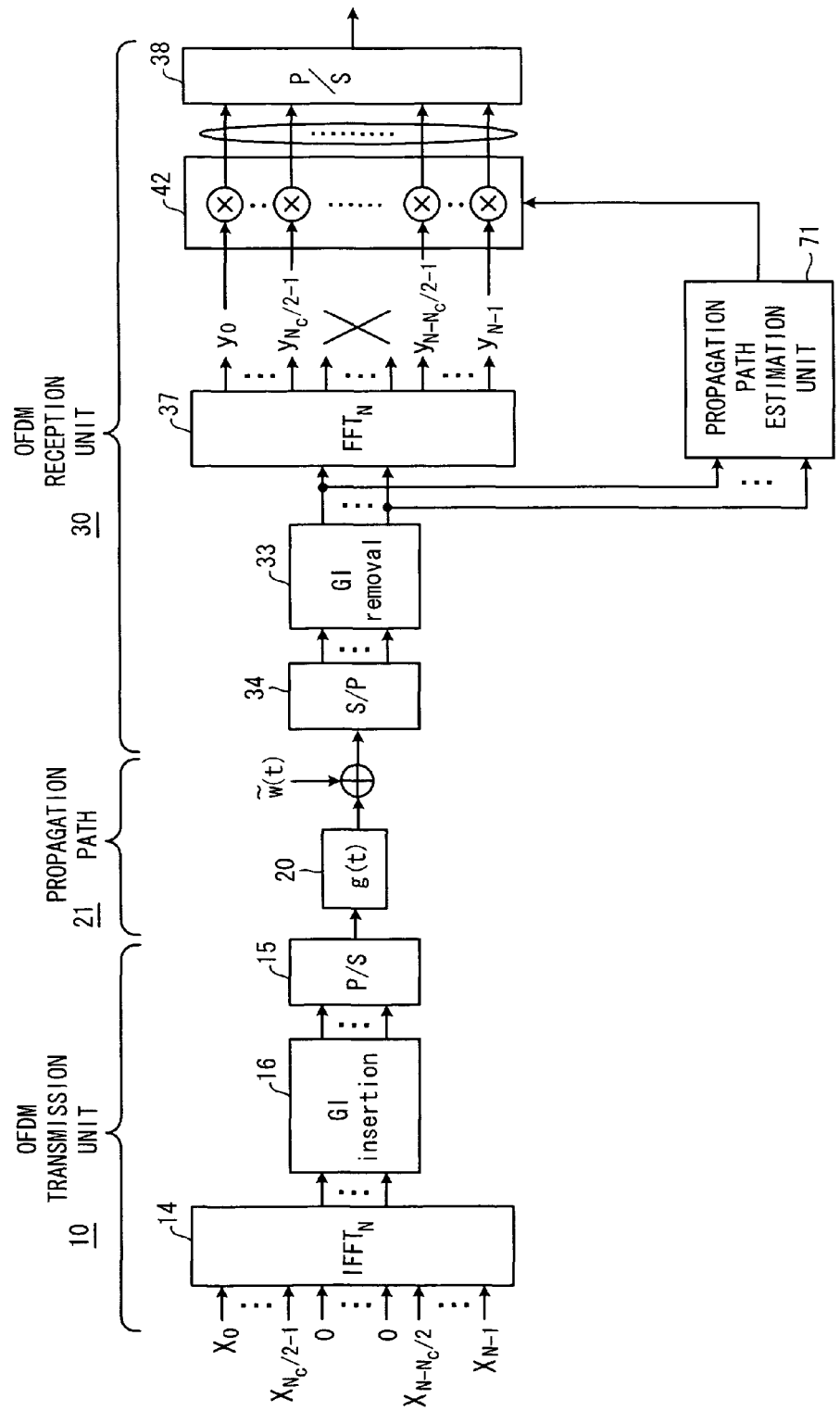
FIG. 20 is a block diagram of the OFDM communication system of a fourth embodiment.

FIG. 20 is a block diagram of the OFDM communication system of the fourth embodiment. The system configuration is equivalent to that of FIG. 14, but a portion of the configuration has been omitted, and the positions of data input to the IFFT unit 14 and data output positions from the FFT unit are clearly indicated. Also, the positions of the P/S converter 15 and guard-interval insertion unit 16, as well as the positions of the guard-interval removal unit 33 and S/P converter 34, are reversed. The propagation path estimation unit 71 in the fourth embodiment has the configuration shown in FIG. 23, described below.

Figure 21:
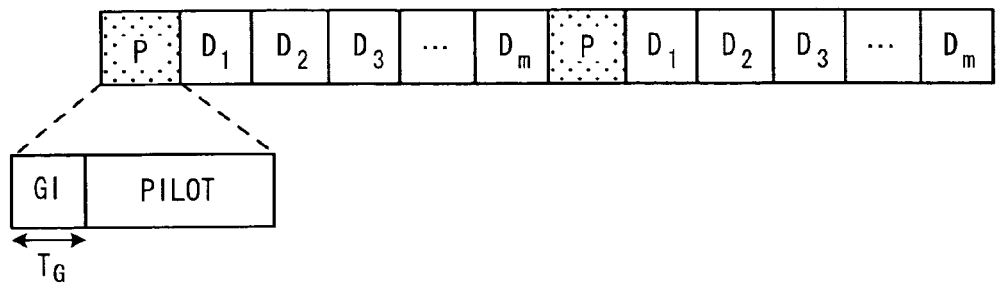
FIG. 21 is an OFDM frame format example.

FIG. 21 is an OFDM frame format example; pilot OFDM symbols P, comprising a plurality of pilot symbols, are time-multiplexed with the data OFDM symbols $D_1$ to $D_m$. A guard interval GI is inserted at the beginning of each OFDM symbol. The placement of pilot symbols is not limited to that of FIG. 21, and placement in arbitrary positions is possible. Also, pilot signals may be placed discretely in the two dimensions of frequency and time.

Figure 22:
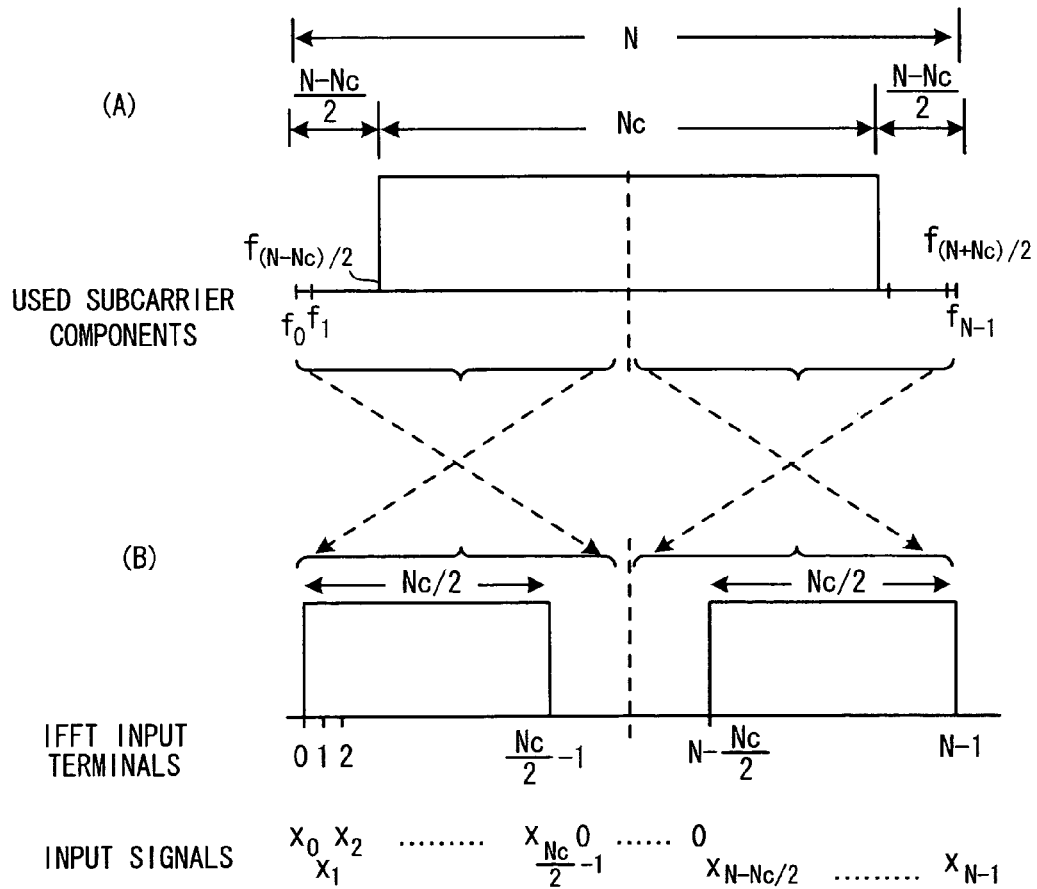
FIG. 22 explains the relation between the number N of IFFT and FFT points and the number $N_C$ of subcarriers used in actual data propagation, and the relation between $N_C$ data items and IFFT data input terminals.

FIG. 22 explains the relation between the number N of IFFT and FFT points and the number $N_C$ of subcarriers used in actual data propagation, and the relation between $N_C$ data items $X_0$ to $X_{Nc/2-1}$ and $X_{N-Nc/2}$ to $X_{N-1}$ and IFFT data input terminals. As shown in (A) of FIG. 22, of the N subcarriers, it is assumed that data propagates on $N_C$ subcarriers, and moreover that there is no data transmission on the (N-$N_C$)/2 subcarriers on the two sides of the N subcarriers. In this case, the data propagated on the $N_C$ subcarriers is divided into two from the center, and as shown in (B) of FIG. 22, is input to $N_C/2$ terminals on both sides of the N-point IFFT unit 14, inverted with respect to the frequency axis. That is, no data is input to the central (N-$N_C$) terminals of the IFFT unit 14. The (N-$N_C$) non-transmitting subcarriers may be placed in any manner. The positions of non-transmitting carriers change only the form of the time response value given by equation (36) described below, but have no effect on this invention. $T_S$ is the sampling rate and $T_G$ is the guard interval (GI) time; the OFDM symbol time in an OFDM communication system using FFT with N points is $$T = N \cdot T_S + T_G.$$

(a) Propagation Path Estimation Unit of the Fourth Embodiment

Figure 23:
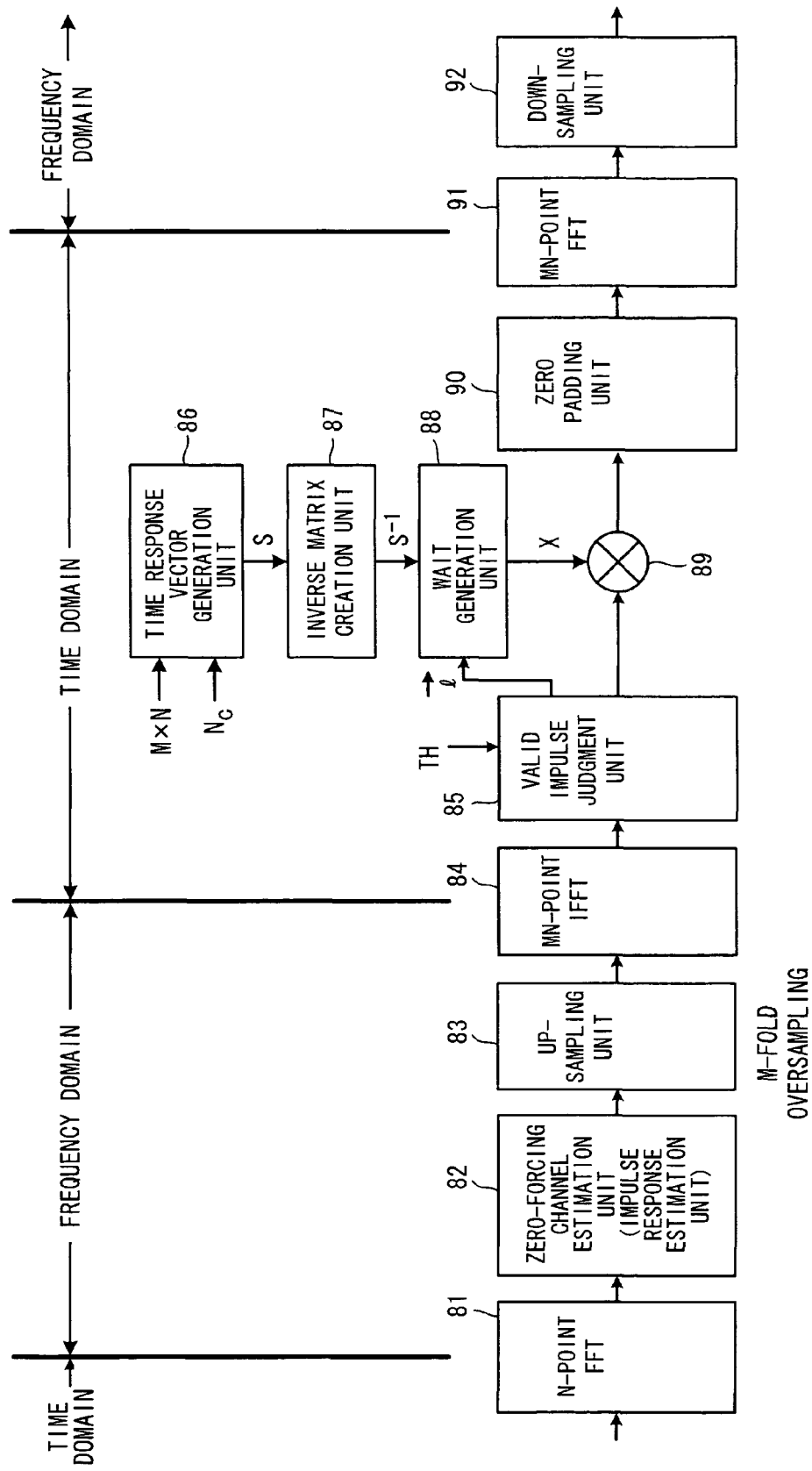
FIG. 23 shows the block configuration of the propagation path estimation unit in the fourth embodiment.
Figure 24:
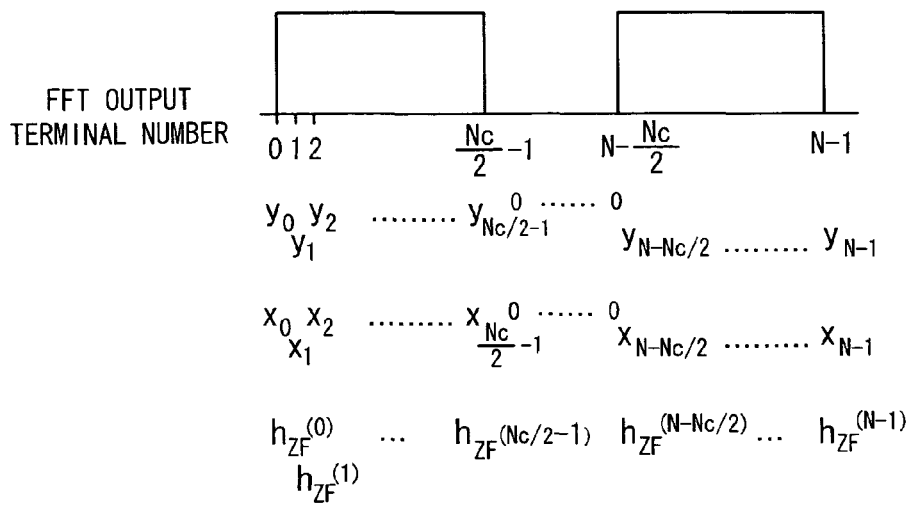
FIG. 24 explains the output of the N-point Fourier transform unit.
Figure 25:
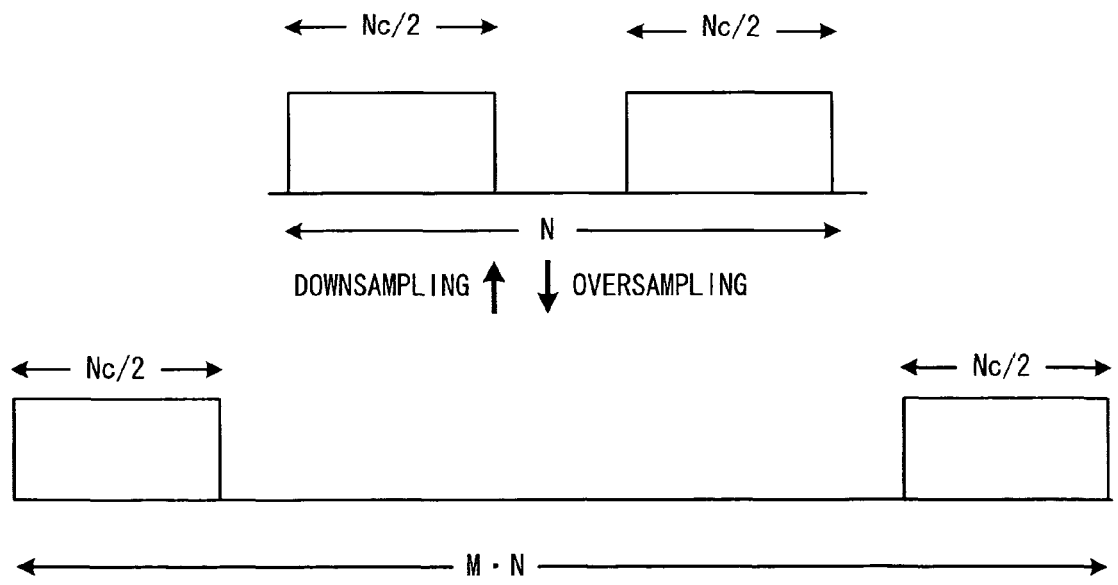
FIG. 25 explains M-fold oversampling and downsampling.

FIG. 23 shows the block configuration of the propagation path estimation unit 71 in the fourth embodiment. The N-point Fourier transform (FFT) unit 81 performs N-point Fourier transform processing of received time-domain pilot signals to convert to the frequency domain, and outputs the results from $N_C/2$ terminals on both sides among the N output terminals 0 to N-1, as shown in FIG. 24. Upon receiving a pilot signal which is a known quantity on the receiving side, the impulse response measurement unit (zero-forcing channel estimation unit) 82 uses the FFT output signal to measure the impulse response $h_{ZF}(0)$ to $h_{ZF}(N-1)$ in the propagation path frequency domain due to zero forcing, and the upsampling unit (oversampling unit) 83 performs M-fold oversampling (where M is an integer greater than or equal to 1, for example 2) of the observed impulse response $h_{ZF}(0)$ to $h_{ZF}(N-1)$, as shown in FIG. 25. The M×N-point inverse Fourier transform (IFFT) unit 84 converts the M-fold oversampled impulse response to the time domain, and the valid impulse judgment unit 85 selects impulse responses equal to or greater than a predetermined threshold value TH from among the time-domain impulse responses, and generates and outputs an impulse response vector, while also outputting a set vector Ĩ, similarly to the first embodiment.

The time response vector generation unit 86 generates a time response vector using time response functions (in the case of the first embodiment, sinc functions), based on an integral multiple M×N of the number N of IFFT points used in OFDM modulation and on the number $N_C$ of subcarriers used in actual propagation, the inverse matrix creation unit 87 creates a time response function vector S using the time response vector, the weight generation unit 88 uses the set vector and m (1≤m≤MN) to create a degenerate matrix S' which reduces the matrix A of equation (19a) or the time response function matrix S, determines the inverse matrix of the degenerate matrix S', and outputs the result as the weight matrix X.

Figure 26:
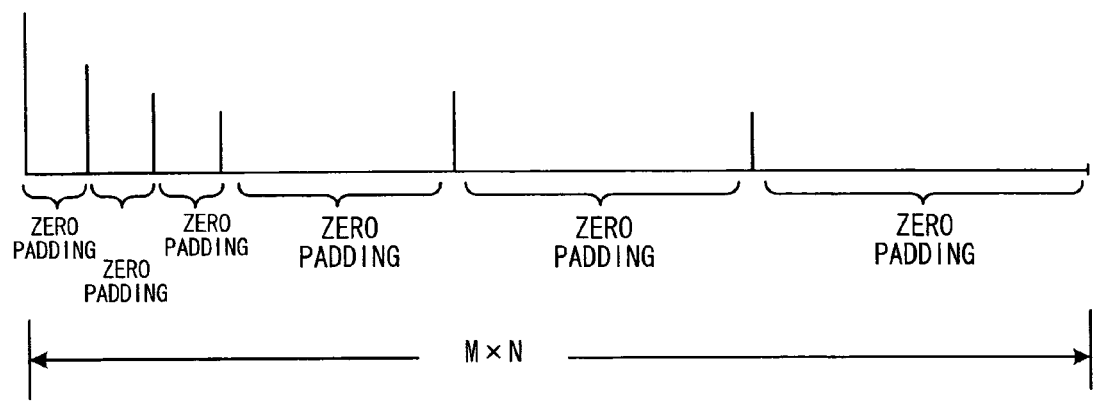
FIG. 26 explains zero padding.

A multiplication unit (propagation path time response estimation unit) 89 multiplies the above impulse response vector by the wait matrix X to estimate the propagation path time response. The zero padding unit 90 inserts zeros at sampling points at which time response was not obtained among the M×N oversampling points, as shown in FIG. 26; the M×N-point Fourier transform (FFT) unit 91 converts the estimated propagation path time response into the frequency domain; and the downsampling unit 92, as shown in FIG. 25, performs M-fold downsampling of the frequency-domain M×N propagation path time responses to obtain N propagation path responses in the frequency domain, and inputs the results to the propagation path compensation unit 42 (see FIG. 20).

In the propagation path estimation unit 71, each of the processing units performs processing in either the frequency domain or in the time domain. In the block configuration, except for the fact that one of the signals input to the time response vector generation unit 86 is changed from N to an M×N, the central inverse matrix operation/estimation block (performing processing in the time domain) is the same as in the first embodiment. However, in this preprocessing M-fold oversampling is performed, so that the size of the matrix S in the first embodiment is changed from N×N to MN×MN. When M=1, the embodiment is the same as the first embodiment, and the preceding and following frequency-domain upsampling/downsampling processing units are omitted.

(b) Explanation of Operation of Propagation Path Estimation Unit Using Equations When the channel impulse response (CIR) over L propagation paths in a multipath environment is $$g(t) = \sum_{l=0}^{L-1} \alpha_l \delta(t - \tau_l) \quad (26)$$

Here, $\alpha_l$ and $\tau_l$ represent the complex amplitude and path position of the lth path. At this time, the maximum-delay path is given by $$\tau_{max} = \tau_{L-1}$$

In this example, the CIR is assumed to satisfy $$0 \leq \tau_{max} \leq T_G$$

Even in cases where $\tau_{max} > T_G$, there is only a difference in the representation of equation (27), and there is no change in the essence of this invention.

Under the above CIR conditions, the N-dimensional received signal vector in the frequency domain after passing through the propagation paths, $$y = [y_0 \ldots y_{N_c/2-1} y_{N_c/2} \ldots y_{N-N_c/2-1} y_{N-N_c/2} \ldots y_{N-1}]^T$$

can be represented as follows.

$$y = FFT_N(IFFT_N(x) \otimes g + \tilde{w}) \quad (27)$$

Here, $\otimes$ is the cyclic convolution operator, and $FFT_N$ and $IFFT_N$ respectively represent the N-point FFT and IFFT operations, defined as follows.

$$IFFT_N(x) = \frac{1}{N} \sum_{n=0}^{N-1} x(n) e^{j2\pi kn/N} \quad (28)$$

$$FFT_N(x) = \sum_{k=0}^{N-1} x(k) e^{-j2\pi kn/N} \quad (29)$$

x, g and w are respectively the N-dimensional transmission signal vector, propagation path response vector, and noise vector, given by $$x = [x_0 \ldots x_{N_c/2-1} 0 \ldots 0 x_{N-N_c/2} \ldots x_{N-1}]^T$$

$$g = [g_0 g_1 \ldots g_{N-1}]^T$$

$$\tilde{w} = [\tilde{w}_0 \tilde{w}_1 \ldots \tilde{w}_{N-1}]^T$$

The right-hand side of equation (27) can be modified as follows.

$$y = X F_N g + w \quad (30)$$

Here X is the diagonal matrix:

$$X = \text{diag}(x_0 \ldots x_{N_c/2-1} 0 \ldots 0 x_{N-N_c/2} \ldots x_{N-1}) \quad (31)$$

$F_N$ is an N×N-dimensional FFT matrix, and the element in the kth row and nth column is represented by $$[F_N]_{k,n} = e^{-j2\pi kn/N} \ 0 \leq k, n \leq N-1$$

Further, $$w = FFT_N(\tilde{w})$$

From equation (30), using the zero forcing (Least Squares) method, which is a propagation path estimation method of the prior art, known transmission symbols are used to estimate the propagation path frequency response as follows.

$$\hat{h}_{ZF} = X^{-1} y = X^{-1}(X F_N g + w) = F_N g + \overline{w} \quad (32)$$

Here, $$\overline{w} = X^{-1} w$$

A feature of this invention is that interference components are suppressed in the time domain.

First, the propagation path frequency response value $\hat{h}_{ZF}$, estimated using the zero forcing method, is subjected to the following M-fold oversampling.

$$\hat{\tilde{h}}_{ZF} = \begin{cases} \hat{h}_{ZF}(n) & 0 \leq n < N_c/2 \\ 0 & N_c/2 \leq n < MN - N_c/2 \\ \hat{h}_{ZF}(n - (M-1)N) & MN - N_c/2 \leq n < MN \end{cases} \quad (33)$$

Here $N_C$ is the number of subcarriers used in transmission.

Next, the frequency response, oversampled in the frequency domain, is converted into the time domain by M×N-point IFFT. This converted signal $\check{g}_{ZF}$ can be expressed as follows.

$$\check{g}_{ZF} = IFFT_{MN}(\hat{\tilde{h}}_{ZF}) = S\check{g} + \overline{\tilde{w}} \quad (34)$$

Here $\check{g}$ is the true time response vector at an M-fold oversampled point, and S is a matrix according to the time response functions, taking into account non-transmitting subcarriers, and defined by the following equation.

$$S = \begin{bmatrix} s(0) & s(1) & \cdots & s(MN/2) & \cdots & s(1) \\ s(1) & \ddots & \ddots & & \ddots & \vdots \\ \vdots & \ddots & \ddots & \ddots & & s(MN/2) \\ s(MN/2) & & \ddots & \ddots & \ddots & \vdots \\ \vdots & \ddots & & \ddots & \ddots & s(1) \\ s(1) & \cdots & s(MN/2) & \cdots & s(1) & s(0) \end{bmatrix} \quad (35)$$

Here, if both edges are assumed to be non-transmitting, s(n) is defined by the following equation. In this example, a sinc function sample point representation is used, but a cyclic matrix S of time response vectors is uniquely determined corresponding to an arbitrary pilot arrangement. That is, it is possible to prepare the matrix S as known information on the receiving side.

$$s(n) = \frac{1}{MN} \cdot \frac{\sin\left(\pi N_c \frac{n}{MN}\right)}{\pi N_c \frac{n}{MN}} \cdot N_c \quad (36)$$

The inverse matrix of the matrix S is found from equation (35), and by multiplying from the left of equation (34), the estimated value of g can be obtained.

$$\hat{\breve{g}}_{IM} = S^{-1}\hat{\breve{g}}_{ZF} = S^{-1}(S\breve{g} + \overline{w}) = \breve{g} + S^{-1}\overline{w} \quad (37)$$

However, an extremely large amount of computation is necessary to find the inverse matrix of S. Hence the degenerate matrix equation of equation (35) is generated in order to enable suppression of interference components represented by $S^{-1}\overline{w}$ and to reduce the amount of computation. To this end, it is noted that in a matrix conforming to the time response function represented by equation (35) such as the sinc function, the power drops off rapidly in moving away from the diagonal components.

The correlation between $\breve{g}$ and $\hat{\breve{g}}_{ZF}$ is high. This is probably because $\hat{\breve{g}}_{ZF}$ is the result of filtering $\breve{g}$ by S. Here, among the components of $\hat{\breve{g}}_{ZF}$, the components below the predetermined threshold value TH are removed, to produce a degenerate matrix as indicated below. First, in equation (34), if the kth sample $\hat{\breve{g}}_{ZF}(k)$ is assumed to be a component below TH, then this sample, and the right-hand side components $\breve{g}(k)$ and $\overline{w}(k)$, corresponding to this, are deleted.

Next, the submatrix S' is generated by deleting rows and columns in S corresponding to the deleted samples. This processing is mathematically called "creating a submatrix, a simple example of which is given below. If M=1 and N=4, then equation (34) is expressed as the following equation $$\begin{bmatrix} \hat{\breve{g}}_{ZF}(0) \\ \hat{\breve{g}}_{ZF}(1) \\ \hat{\breve{g}}_{ZF}(2) \\ \hat{\breve{g}}_{ZF}(3) \end{bmatrix} = \begin{bmatrix} s(0) & s(1) & s(2) & s(1) \\ s(1) & s(0) & s(1) & s(2) \\ s(2) & s(1) & s(0) & s(1) \\ s(1) & s(2) & s(1) & s(0) \end{bmatrix} \cdot \begin{bmatrix} \breve{g}(0) \\ \breve{g}(1) \\ \breve{g}(2) \\ \breve{g}(3) \end{bmatrix} + \begin{bmatrix} \overline{w}(0) \\ \overline{w}(1) \\ \overline{w}(2) \\ \overline{w}(3) \end{bmatrix}$$

Here, it is assumed that samples estimated using ZF (zero forcing) below the threshold TH provided by the system are $$\hat{\breve{g}}_{ZF}(2) \text{ and } \hat{\breve{g}}_{ZF}(3).$$

First, the corresponding right-hand side, $$\breve{g}(2) \text{ and } \breve{g}(3), \quad \overline{w}(2) \text{ and } \overline{w}(3)$$

are deleted. Next, the rows and columns in S corresponding to these deleted samples are deleted, so that the above matrix equation produces the degenerate matrix $$\begin{bmatrix} \hat{\breve{g}}_{ZF}(0) \\ \hat{\breve{g}}_{ZF}(1) \end{bmatrix} = \begin{bmatrix} s(0) & s(1) \\ s(1) & s(0) \end{bmatrix} \cdot \begin{bmatrix} \breve{g}(0) \\ \breve{g}(1) \end{bmatrix} + \begin{bmatrix} \overline{w}(0) \\ \overline{w}(1) \end{bmatrix}$$

Here, the submatrix is $$S' = \begin{bmatrix} s(0) & s(1) \\ s(1) & s(0) \end{bmatrix}$$

The above degenerate matrix equation is the same as equation (22), and this example is in essence the same as the example presented for the first embodiment.

If the matrix equation resulting from degeneracy due to submatrix creation is defined as $$\hat{\breve{g}}'_{ZF} = S'\breve{g}' + \overline{w}' \quad (37)$$

then by determining the inverse matrix of S', it is possible to calculate $\breve{g}'$. The size of S' is extremely small compared with S, and the following equation $$\hat{\breve{g}}'_{DIM} = S'^{-1} \hat{\breve{g}}'_{ZF} \quad (38)$$

obtains. Moreover, by substituting 0 (zero padding) for samples other than the obtained $\hat{\breve{g}}'_{DIM}$, it is possible to suppress interference components.

If the time response value of propagation paths after zero-substitution is completed is $\hat{\breve{g}}_{DIM}$, then the frequency response value can be represented by the equation $$\hat{h}_{DIM} = FFT_{MN}(\hat{\breve{g}}_{DIM}) \quad (39)$$

Hence by performing downsampling according to equation (40), the frequency response value of propagation paths with interference components suppressed can be obtained.

$$\hat{h}_{DIM} = \begin{cases} \hat{h}_{DIM}(n) & 0 \le n < N_c/2 \\ \hat{h}_{DIM}(n + (M-1)N) & N - N_c/2 \le n < N \end{cases} \quad (40)$$

(c) Advantageous Results of the Fourth Embodiment

By means of the fourth embodiment, characteristic degradation is prevented even in more realistic propagation path environments. That is, multipath propagation paths, occurring as physical phenomena, occur for continuous signals, that is, for analog signals. The positions of each of the paths in such a case are not necessarily the sampling positions measured by the system, that is, the sampling intervals, and it is anticipated that deviation from these positions will occur frequently in real environments. It should be noted that a channel mapped to a sampling interval is called a "sample-spaced channel".

Figure 27:
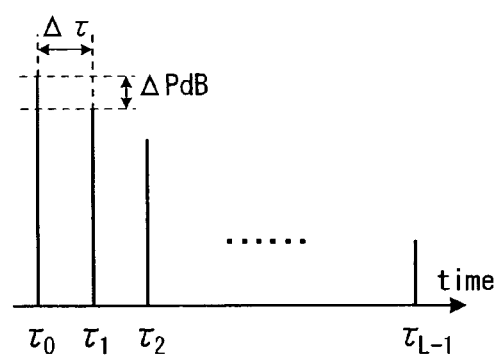
FIG. 27 explains the path model used in simulations.

In the path model used in simulations, an L-path exponential function mode is defined to simulate a real environment. As shown in FIG. 27, each of the L paths is positioned at $\tau_l (0 \le l \le L-1)$, and lth path attenuates as $(l \times \Delta P)$dB in comparison with an advance wave.

Further, the path intervals are defined by $\Delta \tau = \tau_i - \tau_{i-1}$

Here, a channel for which there is not even one path at the sampled position is called a "non-sample-spaced channel", and in equation (26), cases obtain in which there exist one or more paths for which $\tau_l/T_S$ is not an integer. In this channel model, it is known that characteristics are degraded for methods such as that of this invention in which channel estimation is performed in the time domain.

Here, two channel models are studied, and the advantageous results of the fourth embodiment are clarified.
1) Channel A: $\tau_0=0$, $\Delta\tau=18$ (samples) ("sample-spaced channel")
2) Channel B: $\tau_0=T_S/2$, $\Delta\tau=18$ (samples) ("non-sample-spaced channel")

Here, Channel B is a real environment in which all paths doe not exist at the sampled position, and, for the fourth embodiment, can define the worse-case conditions. The simulation conditions appear in Table 1. Here, the threshold value TH is taken to be −16 dB from a sample having the maximum power.

TABLE 1

Simulation parameters

| | |
|---|---|
| Carrier frequency | 5 $GH_Z$ |
| Sampling frequency | 78.34 $MH_Z$ |
| Number of subcarriers | 896 |
| IFFI/FFT Point number | 1024 |
| Subcarrier interval | 76.5 $kH_Z$ |
| Symbol interval | 15.63 us |
| GI length | 2.55 us(200 samples) |
| Frame length | 0.5 ms |
| Modulation method | 16 QAM |
| Error-correction code | Turbocode (R = ½, K = 4) |
| | Max-Log-MAP (iterations = 8) decoding |
| Reception diversity | Yes |
| Propagation path model | L = 12 path exponential attenuation model (FIG. 4) |
| | $\Delta P = 1$ [dB] |
| | Rayleigh fading (fd = 480 $H_Z$) |

Figure 28:
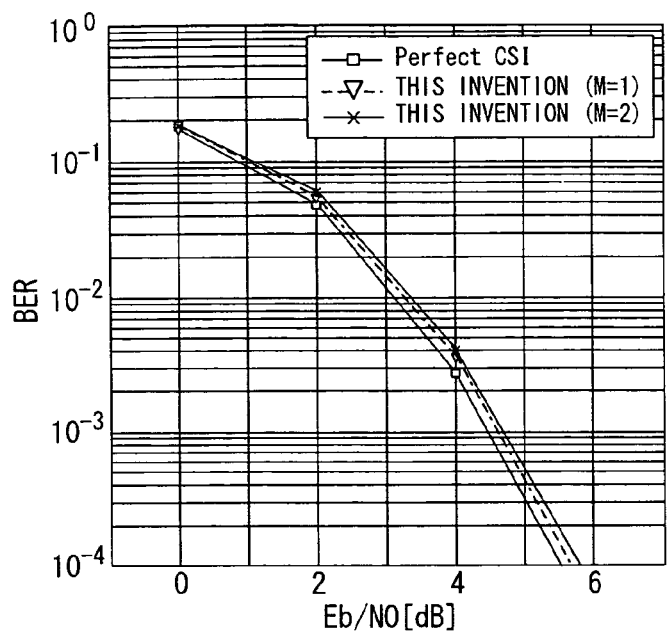
FIG. 28 shows the Eb/No versus BER characteristics for channel A when using 16QAM.
Figure 29:
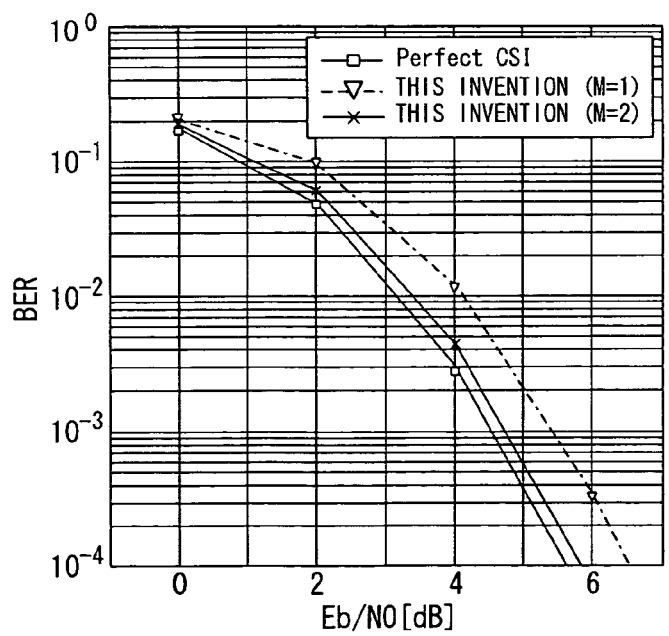
FIG. 29 shows the Eb/No versus BER characteristics for channel B when using 16QAM.

FIG. 28 (Channel A) and FIG. 29 (Channel B) show the Eb/No versus BER characteristics when using 16QAM. The characteristics of the first embodiment with M=1 and the fourth embodiment with M=2 are respectively displayed. From FIG. 28, in Channel A for a BER of $10^{-3}$ with propagation path known (perfect channel-state information, or perfect CSI), degradation of 0.1 dB for the first embodiment with M=1 and of 0.2 dB for the second embodiment are observed. However, as is clear from FIG. 29, for Channel B which is more nearly like a real environment, characteristic degradation does not occur for perfect CSI in the fourth embodiment. In the case of the first embodiment with M=1, it is seen that considerable characteristic degradation (0.9 dB at a BER of $10^{-3}$) occurs.

Figure 30:
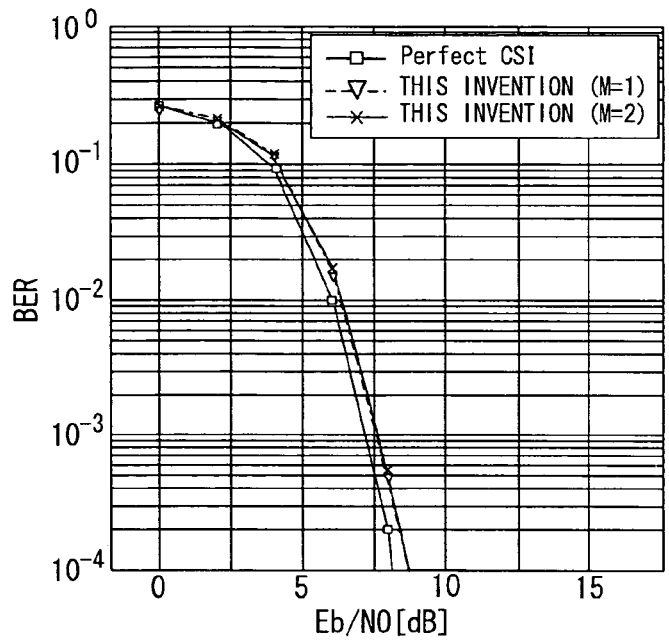
FIG. 30 shows the Eb/No versus BER characteristics for channel A when using 64QAM.
Figure 31:
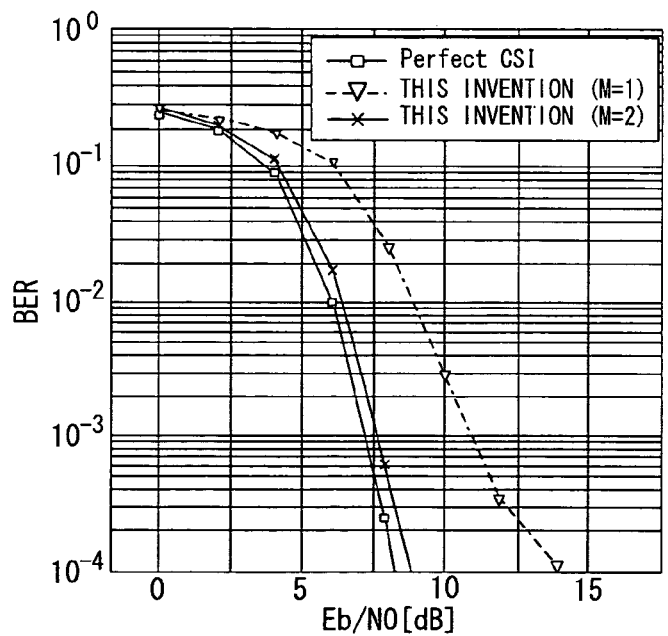
FIG. 31 shows the Eb/No versus BER characteristics for channel B when using 64QAM.
Figure 32:
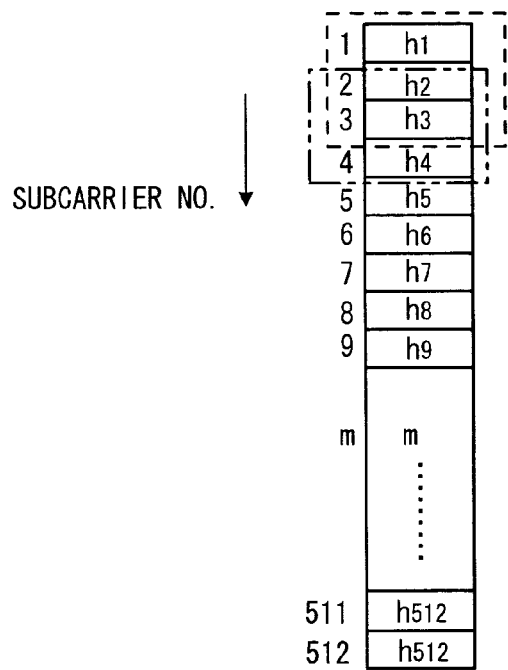
FIG. 32 is a diagram useful in describing a first prior-art technique for suppressing background noise by performing averaging between adjacent subcarriers.
Figure 33:
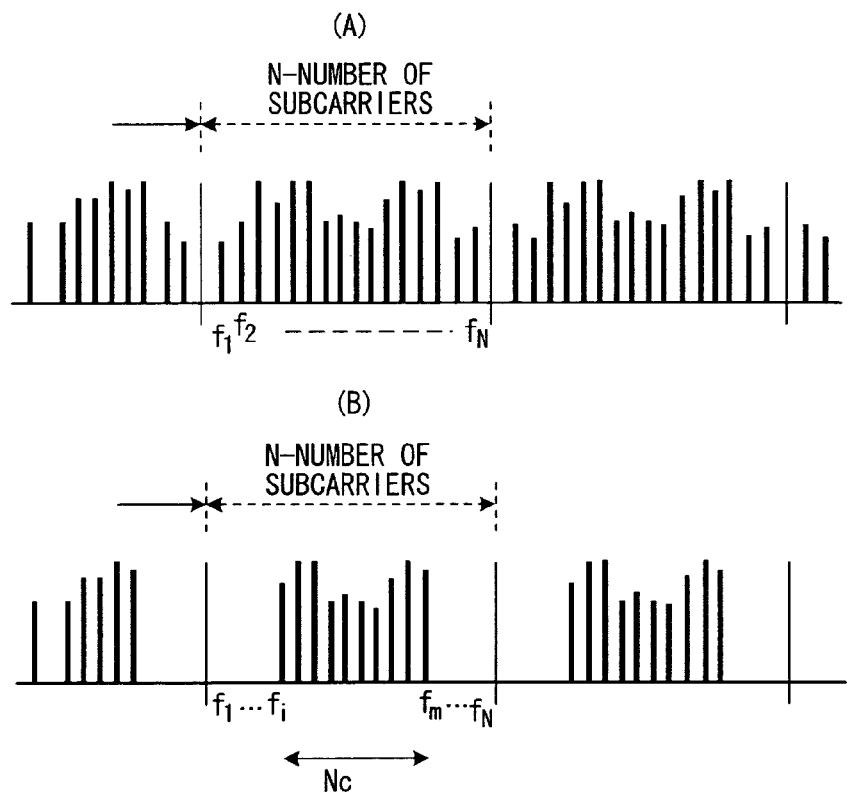
FIG. 33 illustrates a frequency spectrum in a case where all subcarriers $f_1$ to $f_N$ are used in data transmission and a case where data is transmitted using subcarriers obtained by deleting subcarriers on both sides in the prior art.

Further, FIG. 30 (Channel A) and FIG. 31 (Channel B) show the Eb/No versus BER characteristics when using 64QAM. The characteristics of the first embodiment with M=1 and the fourth embodiment with M=2 are respectively displayed. Using 64QAM, with lower noise tolerance than 16QAM, the characteristic degradation for perfect CSI is considerable even for Channel A, as shown in FIG. 30. That is, for BER=$10^{-3}$, degradation of 0.3 dB for perfect CSI with M=1 in the first embodiment, and of 0.4 dB with M=2 in the second embodiment, are observed. However, for Channel B which is more nearly like a real environment, as is clear from FIG. 31, there is no change in the characteristic difference for perfect CSI in the second embodiment with M=2. But in the case of the first embodiment with M=1, it is seen that considerable characteristic degradation occurs (3.7 dB at BER=$10^{-3}$). From the above simulations, by means of the fourth embodiment, noise interference can be suppressed and characteristics can be improved even in channel estimation in real environments in which no paths exist at sampled positions.

As many apparently widely different embodiments of the present invention can be made without departing from the spirit and scope thereof, it is to be understood that the invention is not limited to the specific embodiments thereof except as defined in the appended claims.

Additional Note

1. A propagation path estimation method of a receiver in an OFDM (Orthogonal Frequency Division Multiplexing) communication system for performing communication by OFDM, comprising the steps of:
   estimating a group of impulse responses (CIRs) of a propagation paths;
   selecting impulse responses, which are greater than a predetermined threshold value, from the impulse-response group;
   substituting a predetermined value for samples other than a prescribed number of samples bracketing a maximum peak in each impulse response selected; and
   estimating the propagation paths using the impulse responses obtained by substitution.
2. The method according to item 1, wherein said step of estimating the group of impulse responses (CIRs) includes multiplying a receive-signal vector by a conjugate transposed matrix of known pilot symbols and estimating, on a per propagation-path basis, propagation-path impulse responses (CIRs) comprising a plurality of samples of a time series.
3. The method according to item 1, wherein said step of estimating the propagation paths includes the steps of:
   obtaining an inverse matrix of a sinc-function matrix (S matrix) decided based upon a number N of points of an IFFT used in OFDM modulation and number Nc of subcarriers used in actual transmission;
   multiplying a CIR estimation vector composed of the CIRs by the inverse matrix to thereby calculate a propagation-path response vector; and
   estimating a characteristic of the propagation path from the propagation-path response vector.
4. The method according to item 3, wherein the propagation path is estimated by adopting said prescribed values for those elements of the propagation-path response vector obtained by calculation that are less than a threshold value.
5. The method according to item 1, wherein the prescribed number of samples is decided based upon a number N of points of an IFFT used in OFDM modulation and number Nc of subcarriers used in actual transmission.
6. A propagation path estimation method of a receiver in an OFDM (Orthogonal Frequency Division Multiplexing) communication system for performing communication by OFDM, comprising the steps of:
   estimating a group of impulse responses (CIRs) of propagation paths;
   selecting propagation-path impulse responses (CIRs), which are greater than a predetermined threshold value, from the propagation-path impulse-response group;
   generating a matrix expression using a CIR estimation vector ($\hat{h}_{CIR}$)

that includes the selected CIRs as elements, a matrix S, which is decided based upon number N of points of an IFFT used in OFDM modulation and number Nc of subcarriers used in actual transmission, and a propagation-path response vector ($\hat{h}_r$);

and
   obtaining the propagation-path response vector by solving this matrix expression.
7. The method according to item 6, wherein said step of estimating the group of propagation-path impulse responses (CIRs) includes multiplying a receive-signal vector by a conjugate transposed matrix of known pilot symbols and estimating, on a per-propagation-path basis, a CIR estimation vector $(\hat{\bar{h}}_{CIR})$ comprising a plurality of samples of a time series.

8. The method according to item 6, wherein the matrix S is a sinc-function matrix decided based upon the number N of points of IFFT and number Nc of subcarriers.

9. The method according to item 6, wherein said step of generating the matrix expression includes generating the matrix expression as $\hat{\bar{h}}_{CIR} = S \cdot \bar{h}_t + P_t^* \cdot \bar{w}$ (where $P_t^*$ is a conjugate transposed matrix of known pilot symbols) taking a noise power vector $\vec{w}$ into account, and obtaining the propagation-path response vector from this matrix expression.

10. The method according to item 6, wherein if propagation-path impulse responses (CIR) greater than the threshold value can be divided into a plurality of blocks, the matrix expression is generated block by block to thereby obtain the propagation-path response vector.

11. The method according to item 9, wherein if there is even a single propagation-path impulse response (CIR) that belongs to the blocks, then the propagation-path response vector is found by multiplying the CIR estimation vector by a fixed value, which is decided based upon the number N of points and number Nc of subcarriers, without generating a matrix expression.

12. The method according to item 6, wherein said step of obtaining the propagation-path response vector includes the steps of:

obtaining an inverse matrix of the matrix S, which is a sinc-function decided based upon the number N of points of the IFFT and number Nc of subcarriers; and multiplying the CIR estimation vector by the inverse matrix to thereby obtain the propagation-path response vector.

13. The method according to item 6, wherein said step of obtaining the propagation-path response vector includes the steps of:

obtaining a matrix that is in accordance with standard of an MMSE (Minimum Mean Square Error) using the matrix S, which is a sinc-function matrix decided based upon the number N of points of the IFFT and number Nc of subcarriers, and variance of noise; and multiplying the CIR estimation vector by the matrix to thereby obtain the propagation-path response vector.

14. The method according to item 12 or 13, wherein the propagation path is estimated by adopting prescribed values for those elements of the propagation-path response vector obtained by calculation that are less than a threshold value.

15. The method according to item 6 or 14, wherein the threshold value is made power that is lower than a maximum peak value of the CIR by a value decided based upon the number N of points of the IFFT used in OFDM modulation and the number Nc of subcarriers used in actual transmission, or is made power that is greater than estimated background noise power by a predetermined value.

16. A propagation path estimation apparatus of a receiver in an OFDM (Orthogonal Frequency Division Multiplexing) communication system for performing communication by OFDM, comprising:

a CIR estimation unit for estimating a group of impulse responses (CIRs) of propagation paths;

a valid-impulse discriminator for selecting impulse responses, which are greater than a predetermined threshold value, from the impulse-response group and substituting predetermined value for samples other than a prescribed number of samples bracketing a maximum peak in each impulse response selected; and a propagation path estimation unit for estimating the propagation path using the valid impulse responses.

17. The apparatus according to item 16, wherein said CIR estimation unit multiplies a receive-signal vector by a conjugate transposed matrix of a known symbol and estimates, on a per-propagation-path basis, propagation-path impulse responses (CIRs) comprising a plurality of samples of a time series.

18. The apparatus according to item 16, wherein said propagation path estimation unit includes:

means for acquiring a sinc-function matrix (S matrix) decided based upon a number N of points of an IFFT used in OFDM modulation and number Nc of subcarriers used in actual transmission, and an inverse matrix of this matrix;

means for multiplying a CIR estimation vector composed of the CIRs by the inverse matrix to thereby calculate a propagation-path response vector.

19. The apparatus according to item 18, wherein said propagation path estimation unit includes means for estimating the propagation path by adopting said prescribed values for those elements of the propagation-path response vector obtained by calculation that are less than a threshold value.

20. A propagation path estimation apparatus of a receiver in an OFDM (Orthogonal Frequency Division Multiplexing) communication system for performing communication by OFDM, comprising:

a CIR estimation unit for estimating a group of impulse responses (CIRs) of propagation paths;

a valid-impulse discriminator for selecting propagation-path impulse responses (CIRs), which are greater than a predetermined threshold value, from the propagation-path impulse-response group; and a propagation path estimation unit for generating a matrix expression using a CIR estimation vector $(\hat{\bar{h}}_{CIR})$ that includes the selected CIRs as elements, a matrix S, which is decided based upon number N of points of an IFFT used in OFDM modulation and number Nc of subcarriers used in actual transmission, and a propagation-path response vector $(\bar{h}_t)$, obtaining the propagation-path response vector by solving this matrix expression and estimating the propagation path using this response vector.

21. The apparatus according to item 20, wherein said CIR estimation unit includes means for multiplying a receive-signal vector by a conjugate transposed matrix of known pilot symbols and estimating, on a per-propagation-path basis, a CIR estimation vector $(\hat{\bar{h}}_{CIR})$ comprising a plurality of samples of a time series.

22. The apparatus according to item 20, wherein said propagation-path estimation unit includes:

means for calculating an inverse matrix of the matrix S, which is a sinc-function decided based upon the number N of points of the IFFT and number Nc of subcarriers; and means for multiplying the CIR estimation vector by the inverse matrix to thereby obtain the propagation-path response vector.

23. The apparatus according to item 20, wherein said propagation-path estimation unit includes:

means for obtaining a matrix that is in accordance with standard of an MMSE (Minimum Mean Square Error) using the matrix S, which is a sinc-function matrix decided based upon the number N of points of the IFFT and number Nc of subcarriers, and variance of noise; and means for multiplying the CIR estimation vector by the matrix to thereby obtain the propagation-path response vector.

24. The apparatus according to item 22 or 23, wherein said propagation-path estimation unit further includes means for estimating the propagation path by adopting prescribed values for those elements of the propagation-path response vector obtained by calculation that are less than a threshold value.

25. A path searcher of a RAKE receiver in a CDMA communication system, comprising:

a CIR estimation unit for estimating a group of impulse responses (CIRs) of propagation paths;

a valid-impulse discriminator for selecting propagation-path impulse responses (CIRs), which are greater than a predetermined threshold value, from the propagation-path impulse-response group; and a propagation path estimation unit for estimating the propagation path using the CIRs;

wherein said propagation path estimation unit generates a matrix expression using a CIR estimation vector ($\tilde{h}_{CIR}$)

that includes the selected CIRs as elements, a matrix S, which is decided by impulse responses of a low-pass filter, and a propagation-path response vector ($\tilde{h}_t$)

and searching for a propagation path by obtaining the propagation-path response vector by solving this matrix expression.

26. A propagation path estimation method of a receiver in an OFDM communication system which communicates using an orthogonal frequency division multiplexing (OFDM), comprising the steps of:

estimating impulse responses of propagation paths in the frequency domain;

subjecting the estimated impulse responses to M-fold oversampling (where M is an integer greater than or equal to 1);

converting the M-fold oversampled impulse responses into the time domain;

selecting, among the time-domain impulse responses, impulse responses equal to or greater than a predetermined threshold value;

replacing everything other than a prescribed number of samples before and after the maximum peak in the selected impulse responses with a prescribed value;

estimating propagation path time response using impulse responses obtained from said replacement; and, after converting estimated time responses into the frequency domain, performing M-fold downsampling and estimating the propagation path.

27. An OFDM propagation path estimation method of receiver in an OFDM communication system which communicates using an orthogonal frequency division multiplexing (OFDM) comprising steps of:

estimating impulse responses of propagation paths in the frequency domain;

subjecting the estimated impulse responses to M-fold oversampling (where M is an integer greater than or equal to 1);

converting the M-fold oversampled impulse responses into the time domain;

selecting, among the time-domain impulse responses, impulse responses equal to or greater than a predetermined threshold value, and generating an impulse response vector;

creating a time response function matrix according to time response functions, based on an integral multiple M☐N of the number N of IFFT points used in OFDM conversion and on the number NC of subcarriers used actually in propagation, and multiplying the inverse matrix thereof by said impulse response vector to estimate the propagation path time response; and, after converting the estimated time response into the frequency domain, performing M-fold downsampling and estimating the propagation path.

28. The OFDM propagation path estimation method according to item 27, wherein replacing everything other than a prescribed number of samples before and after the maximum peak in said time response function by a prescribed value so as to create said time response function matrix.

29. The OFDM propagation path estimation method according to item 27 or item 28, wherein time-domain pilot reception signals are subjected to N-point Fourier transform processing and are converted into the frequency domain, and the frequency-domain signals are used to estimate the propagation path impulse response in the frequency domain.

30. The OFDM propagation path estimation method according to item 26 or item 27, wherein said M-fold oversampled impulse response is converted into a time-domain impulse response by M×N-point inverse Fourier transfer processing, and said propagation path time response is converted into a frequency-domain propagation path time response by M×N-point Fourier transform processing.

31. A propagation path estimation apparatus of a receiver in an OFDM communication system which communicates using an orthogonal frequency division multiplexing (OFDM), comprising:

an impulse response estimation unit, which estimates impulse responses in the frequency domain of propagation paths;

an oversampling unit, which performs M-fold oversampling (where M is an integer greater than or equal to 1) of the estimated impulse responses;

an inverse Fourier transform unit, which converts the M-fold oversampled impulse responses into the time domain;

a valid impulse judgment unit, which selects, from among the time-domain impulse responses, impulse responses greater than or equal to a predetermined threshold value;

an estimation unit, which replaces everything other than a prescribed number of samples before and after the maximum peak in the selected impulse responses by a prescribed value;

a Fourier transform unit, which converts the estimated propagation path time responses into the frequency domain; and, a propagation path estimation unit, which performs M-fold downsampling of the time response in the frequency domain and estimates the propagation path.

32. A propagation path estimation apparatus of a receiver in an OFDM communication system which communicates using an orthogonal frequency division multiplexing (OFDM), comprising:

an impulse response estimation unit, which estimates impulse responses in the frequency domain of propagation paths;

an oversampling unit, which performs M-fold oversampling (where M is an integer greater than or equal to 1) of the estimated impulse responses;

an inverse Fourier transform unit, which converts the M-fold oversampled impulse responses into the time domain;

a valid impulse judgment unit, which selects, from among the time-domain impulse responses, impulse responses greater than or equal to a predetermined threshold value, and generates an impulse response vector;

a propagation path time impulse estimation unit, which creates a time response function matrix using a time response function based on an integral multiple M☐N of the number N of IFFT points used in OFDM modulation and on the number $N_C$ of subcarriers used in actual propagation, and which estimates the propagation path time response by multiplying the inverse matrix thereof by said impulse response vector;

a Fourier transform unit, which converts the estimated propagation path time response into the frequency domain; and, means for performing M-fold downsampling of the propagation path time response in the frequency domain and for estimating the propagation path.

33. The propagation path estimation apparatus according to item 32, wherein said propagation path time response estimation unit creates said time response function matrix such that everything other than a prescribed number of samples before and after the maximum peak in said selected impulse response is replaced with a prescribed value.

34. The propagation path estimation apparatus according to item 31 or item 32, further comprising a Fourier transform unit which subjects time-domain pilot reception signals to N-point Fourier transform processing for conversion to the frequency domain, and wherein said impulse response estimation unit uses the frequency-domain signals to estimate the propagation path impulse response of propagation paths in the frequency domain.

What is claimed is:

1. A propagation path estimation apparatus of a receiver in an OFDM (Orthogonal Frequency Division Multiplexing) communication system for performing communication by OFDM, comprising:

a CIR estimation unit that estimates a group of impulse responses (CIRs) of propagation paths;

a valid-impulse discriminator that selects impulse responses, which are greater than a predetermined threshold value, from the group of impulse responses (CIRs) and substitutes predetermined value for samples other than a prescribed number of samples bracketing a maximum peak in each impulse response selected to generate valid impulse responses; and a propagation path estimation unit that estimates the propagation path using the valid impulse responses, wherein said propagation path estimation unit includes:

an acquisition unit that acquires a sinc-function matrix (S matrix) decided based upon a number N of points of an IFFT used in OFDM modulation and number Nc of subcarriers used in actual transmission, and an inverse matrix of the S matrix;

a multiplier that multiplies a CIR estimation vector composed of the valid CIRs by the inverse matrix to thereby calculate a propagation-path response vector.

2. The apparatus according to claim 1, wherein said propagation path estimation unit includes an estimation unit that estimates the propagation path by adopting said prescribed values for those elements of the propagation-path response vector obtained by calculation that are less than a threshold value.

3. A path searcher of a RAKE receiver in a CDMA communication system, comprising:

a CIR estimation unit that estimates a group of impulse responses (CIRs) of propagation paths;

a valid-impulse discriminator that selects impulse responses, which are greater than a predetermined threshold value, from the group of impulse responses (CIRs) and substitutes predetermined value for samples other than a prescribed number of samples bracketing a maximum peak in each impulse response selected to generate valid impulse responses; and a propagation path estimation unit that estimates the propagation path using the valid impulse responses;

wherein said propagation path estimation unit includes:

an acquisition unit that acquires a sinc-function matrix (S matrix) decided based upon a number N of points of an IFFT used in OFDM modulation and number Nc of subcarriers used in actual transmission, and an inverse matrix of the S matrix; and a multiplier that multiplies a CIR estimation vector composed of the valid CIRs by the inverse matrix to thereby search for a propagation-path response vector.

4. A propagation path estimation apparatus of a receiver in an OFDM communication system which communicates using an orthogonal frequency division multiplexing (OFDM), comprising:

an impulse response estimation unit, which estimates impulse responses in a frequency domain of propagation paths;

an oversampling unit, which performs M-fold oversampling (where M is an integer greater than or equal to 1) of the estimated impulse responses;

an inverse Fourier transform unit, which converts the M-fold oversampled impulse responses into a time domain;

a valid impulse judgment unit, which selects, from among the time-domain impulse responses, impulse responses equal to or greater than a predetermined threshold value;

an estimation unit, which replaces everything other than a prescribed number of samples before and after the maximum peak in the selected impulse responses with a prescribed value and estimates propagation path time response using impulse responses obtained from said replacement multiplied by an inverse matrix of a sinc-function matrix;

a Fourier transform unit, which converts the estimated propagation path time responses into the frequency domain; and a propagation path estimation unit, which performs M-fold downsampling of the time response in the frequency domain and estimates the propagation path.

5. The propagation path estimation apparatus according to claim 4, wherein the valid impulse judgment unit, generates an impulse response vector by selecting impulse responses greater than or equal to a predetermined threshold value and the propagation path time impulse estimation unit, creates a time response function matrix using a time response function based on an integral multiple M×N of the number N of IFFT points used in OFDM modulation and on the number $N_C$ of subcarriers used in actual propagation, and estimates the propagation path time response by multiplying the inverse matrix thereof by said impulse response vector.

6. The propagation path estimation apparatus according to claim 5, wherein said propagation path time response estimation unit creates said time response function matrix such that everything other than a prescribed number of samples before and after the maximum peak in said selected impulse response is replaced with a prescribed value.

7. The propagation path estimation apparatus according to claim 4, wherein the Fourier transform unit subjects time-domain pilot reception signals to N-point Fourier transform processing for conversion to the frequency domain, and wherein said impulse response estimation unit uses the frequency-domain signals to estimate the propagation path impulse response in the frequency domain of propagation paths.

* * * * *